US011528519B2

(12) United States Patent
Bae et al.

(10) Patent No.: US 11,528,519 B2
(45) Date of Patent: *Dec. 13, 2022

(54) METHOD AND APPARATUS FOR TRANSMITTING AND RECEIVING SIGNALING INFORMATION ASSOCIATED WITH MULTIMEDIA CONTENT

(71) Applicant: Samsung Electronics Co., Ltd., Suwon-si (KR)

(72) Inventors: Jae-Hyeon Bae, Seoul (KR); Kyung-Mo Park, Seoul (KR); Young-Wan So, Gunpo-si (KR); Hyun-Koo Yang, Seoul (KR); Sung-Hee Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/390,183

(22) Filed: Jul. 30, 2021

(65) Prior Publication Data
US 2021/0360297 A1 Nov. 18, 2021

Related U.S. Application Data

(63) Continuation of application No. 16/594,817, filed on Oct. 7, 2019, now Pat. No. 11,082,729, which is a (Continued)

(30) Foreign Application Priority Data

Jan. 19, 2015 (KR) .................. 10-2015-0008946
Jan. 30, 2015 (KR) .................. 10-2015-0015547

(51) Int. Cl.
*H04N 7/173* (2011.01)
*H04N 21/2381* (2011.01)
(Continued)

(52) U.S. Cl.
CPC ......... *H04N 21/2381* (2013.01); *H04L 69/18* (2013.01); *H04L 69/24* (2013.01);
(Continued)

(58) Field of Classification Search
CPC ............. H04N 21/238; H04N 21/2381; H04N 21/6125; H04N 21/4383; H04N 21/47202;
(Continued)

(56) References Cited

U.S. PATENT DOCUMENTS 10,448,068 B2 * 10/2019 Bae .................. H04L 69/24
11,082,729 B2 * 8/2021 Bae .................. H04N 21/2381
(Continued)

FOREIGN PATENT DOCUMENTS

CN 103988479 A 8/2014
KR 10-2009-0021120 A 2/2009
(Continued)

OTHER PUBLICATIONS

Sung Oh Hwang et al., Guidelines on how to provide MMT transport over Broadcasting Network, MMT over DVB-T2 CE Participants, ISO/IEC JTC1/SC29/WG11 MPEG 2013, XP030058054, Apr. 25, 2013, Incheon, Korea.
(Continued)

*Primary Examiner* — Gigi L Dubasky
(74) *Attorney, Agent, or Firm* — Jefferson IP Law, LLP

(57) ABSTRACT

The present disclosure relates to a method of transmitting multimedia content in a broadcast communication system, and comprises the steps of: identifying protocol information mapped for each service corresponding to multimedia content; transmitting service-related information including the identified protocol information mapped for each service; and transmitting multimedia content corresponding to related services to a receiving side by using the identified protocol.

6 Claims, 17 Drawing Sheets

Related U.S. Application Data continuation of application No. 15/544,423, filed as application No. PCT/KR2016/000552 on Jan. 19, 2016, now Pat. No. 10,448,068.

(51) Int. Cl.
| | | |
|---|---|---|
| *H04N 21/238* | (2011.01) | |
| *H04L 69/18* | (2022.01) | |
| *H04L 69/24* | (2022.01) | |
| *H04N 21/61* | (2011.01) | |
| *H04N 21/438* | (2011.01) | |
| *H04N 21/472* | (2011.01) | |

(52) U.S. Cl.
CPC ....... *H04N 21/238* (2013.01); *H04N 21/6125* (2013.01); *H04N 21/4383* (2013.01); *H04N 21/47202* (2013.01)

(58) Field of Classification Search
CPC ............ H04N 21/2389; H04N 21/6175; H04L 69/18; H04L 69/24
See application file for complete search history.

(56) References Cited

U.S. PATENT DOCUMENTS

| | | |
|---|---|---|
| 2007/0107013 A1 | 5/2007 | Seppala et al. |
| 2008/0129878 A1 | 6/2008 | Hong et al. |
| 2008/0235723 A1 | 9/2008 | Park et al. |
| 2008/0307478 A1 | 12/2008 | Kim et al. |
| 2009/0052580 A1 | 2/2009 | Song et al. |
| 2012/0317461 A1 | 12/2012 | Hwang et al. |
| 2013/0167172 A1 | 6/2013 | Suh et al. |
| 2013/0258946 A1 | 10/2013 | Yie et al. |
| 2014/0282798 A1 | 9/2014 | Hwang et al. |
| 2014/0313916 A1 | 10/2014 | Hwang et al. |
| 2014/0317674 A1 | 10/2014 | Hwang et al. |
| 2016/0345033 A1 | 11/2016 | Kwak et al. |
| 2017/0164071 A1 | 6/2017 | An et al. |
| 2019/0356933 A1* | 11/2019 | Oh ..................... H04N 21/2362 |

FOREIGN PATENT DOCUMENTS

| | | |
|---|---|---|
| KR | 10-2009-0110053 A | 10/2009 |
| KR | 10-1034849 B1 | 5/2011 |
| KR | 10-2012-0079952 A | 7/2012 |
| KR | 10-1377952 B1 | 3/2014 |
| KR | 10-2014-0126827 A | 11/2014 |

OTHER PUBLICATIONS

Sungoh Hwang, MMT_usage_in_DVB-T2, XP030057937, Samsung Electronics, Apr. 23, 2013.
Chinese Office Action with English translation dated Aug. 1, 2019; Chinese Appln. No. 201680006400.0.
Indian Examination Report dated Jan. 6, 2021, issued in Indian Application No. 201717027657.
Korean Office Action dated May 17, 2022, issued in Korean Patent Application No. 10-2017-7023265.

* cited by examiner

METHOD AND APPARATUS FOR TRANSMITTING AND RECEIVING SIGNALING INFORMATION ASSOCIATED WITH MULTIMEDIA CONTENT

CROSS-REFERENCE TO RELATED APPLICATION(S)

This application is a continuation application of prior application Ser. No. 16/594,817, filed on Oct. 7, 2019, which is a continuation application of prior application Ser. No. 15/544,423, filed on Jul. 18, 2017, which has issued as U.S. Pat. No. 10,448,068 on Oct. 15, 2019, which is a U.S. National Stage application under 35 U.S.C. § 371 of an International application number PCT/KR2016/000552, filed on Jan. 19, 2016, which was based on and claimed priority under 35 U.S.C § 119(a) of a Korean patent application number 10-2015-0008946, filed on Jan. 19, 2015, in the Korean Intellectual Property Office, and of a Korean patent application number 10-2015-0015547, filed on Jan. 30, 2015, in the Korean Intellectual Property Office, the disclosure of each of which is incorporated by reference herein in its entirety

TECHNICAL FIELD

The present disclosure relates to a method and apparatus for transmitting and receiving multimedia content.

BACKGROUND

With the explosive growth of wired/wireless Internet, various types of Internet televisions (TVs) are expected to be used widely in the future. Although audio/video (A/V) signal delivery over the wired/wireless Internet may not be able to replace existing broadcasting for the present, future broadcasting services may evolve into a hybrid service type that integrates a broadcasting network with the Internet. Unlike in the past when a dedicated network was used for content delivery between studios or content delivery to a secondary distribution network, in recent times, content is delivered through an Internet protocol (IP) network to reduce cost incurred by the use of a separate dedicated network and to cut down high equipment cost caused by a specified interface.

Current digital broadcasting is expected to evolve into stereo three-dimensional (3D) video broadcasting, ultra-high definition (UHD) broadcasting, multi-view 3D video broadcasting, hologram broadcasting, etc., and there is a prospect that a current Moving Picture Experts Group 2 (MPEG2)—transport stream (TS) may become inefficient because in each forward step, a larger amount of transmission is required. For example, since UHD broadcasting may have a resolution that is four-times (4K-level) or 16-times than that of an existing high definition (HD) TV, a 6-MHz TV program may be difficult to transmit in one channel despite application of a high-efficiency compression scheme. Thus, the MPEG-2 TS having a fixed-length packet of 188 bytes is inefficient to support a high data rate. Moreover, in an environment where all other networks than a broadcasting network change into IP networks, the MPEG-2 TS is difficult to use by mutual conversion with the IP. Hence, at the near, not to say immediate, moment when UHD broadcasting is to be commercialized, a new AV delivery format may be required which is IP-friendly and more efficient than the MPEG-2 TS.

FIG. 1 illustrates an example of a protocol information configuration defined for each service component in a general IP broadcasting network service.

Referring to FIG. 1, in a broadcasting service provided by an existing IP broadcasting network 100, a protocol is clearly defined for each service and details thereof are described in an electronic service guide (ESG) or an electronic program guide (EPG). Taking a digital video broadcasting-handheld (DVB-H)-based technique as an example, AV streaming uses a real-time transport protocol (RTP) as indicated by 102 and a file data service uses a file delivery over unidirectional transport (FLUTE) as indicated by 104. That is, a protocol specific to each service is used.

SUMMARY

As demands for various services including non-real-time services, such as a video on demand (VoD) service, etc., are increasing, a new-type system capable of satisfying various demands beyond an existing simple broadcasting system is required in existing techniques using one fixed protocol regardless of a service type.

For example, a DVB-H-based real-time service as shown in FIG. 1 uses an RTP for data transmission. A data packet (hereinafter, referred to as an 'RTP packet') transmitted using the RTP may not surely arrive at a reception side in the same order as transmitted from a transmission side. Moreover, all the transmitted RTP packets are not certain to arrive correctly at the reception side. As such, the RTP fails to provide a way to guarantee the quality of a service in spite of excellent real-time transmission performance. Accordingly, there is a need for another transmission protocol capable of making up for such weak points and a broadcasting service structure capable of supporting the protocol.

An embodiment of the present disclosure provides a method for transmitting multimedia content based on a protocol suitable for each environment depending on real-time/non-real-time service characteristics and a transmission apparatus for performing the transmission.

To this end, an embodiment of the present disclosure provides a scheme for transmitting protocol information mapped to each service to a reception apparatus.

An embodiment of the present disclosure also provides a method for receiving protocol information mapped to each service, transmitted by a transmission apparatus, and efficiently identifying and receiving a service configured with a different protocol based on the protocol information, and a reception apparatus for performing the reception.

According to an embodiment of the present disclosure, there is provided a method for transmitting multimedia content in a broadcasting communication system, the method including identifying protocol information mapped for each service corresponding to multimedia content, transmitting service-related information including the identified protocol information mapped for each service, and transmitting multimedia content corresponding to a service to a reception side by using the identified protocol.

According to an embodiment of the present disclosure, there is provided a method for receiving multimedia content in a broadcasting communication system, the method including receiving service-related information including protocol information mapped for each service corresponding to multimedia content, receiving multimedia content corresponding to a service, identifying a protocol corresponding to the service from the protocol information mapped for each service, and playing back the multimedia content by using the identified protocol.

According to an embodiment of the present disclosure, there is provided an apparatus for transmitting multimedia content in a broadcasting communication system, the apparatus including a controller configured to identify protocol information mapped for each service corresponding to multimedia content, and a transceiver configured to transmit service-related information including the identified protocol information mapped for each service and to transmit multimedia content corresponding to a service to a reception side by using the identified protocol.

According to an embodiment of the present disclosure, there is provided an apparatus for receiving multimedia content in a broadcasting communication system, the apparatus including a transceiver configured to receive service-related information including protocol information mapped for each service corresponding to multimedia content and to receive multimedia content corresponding to a service and a controller configured to identify a protocol corresponding to the service from the protocol information mapped for each service and to play back the multimedia content by using the identified protocol.

BRIEF DESCRIPTION OF THE DRAWINGS

FIG. 2B is a flowchart of operations when a reception apparatus according to an embodiment of the present disclosure receives service-related information according to an embodiment of the present disclosure if performing channel switchover, or performing channel selection upon powered on;

DETAILED DESCRIPTION

Figure 1:
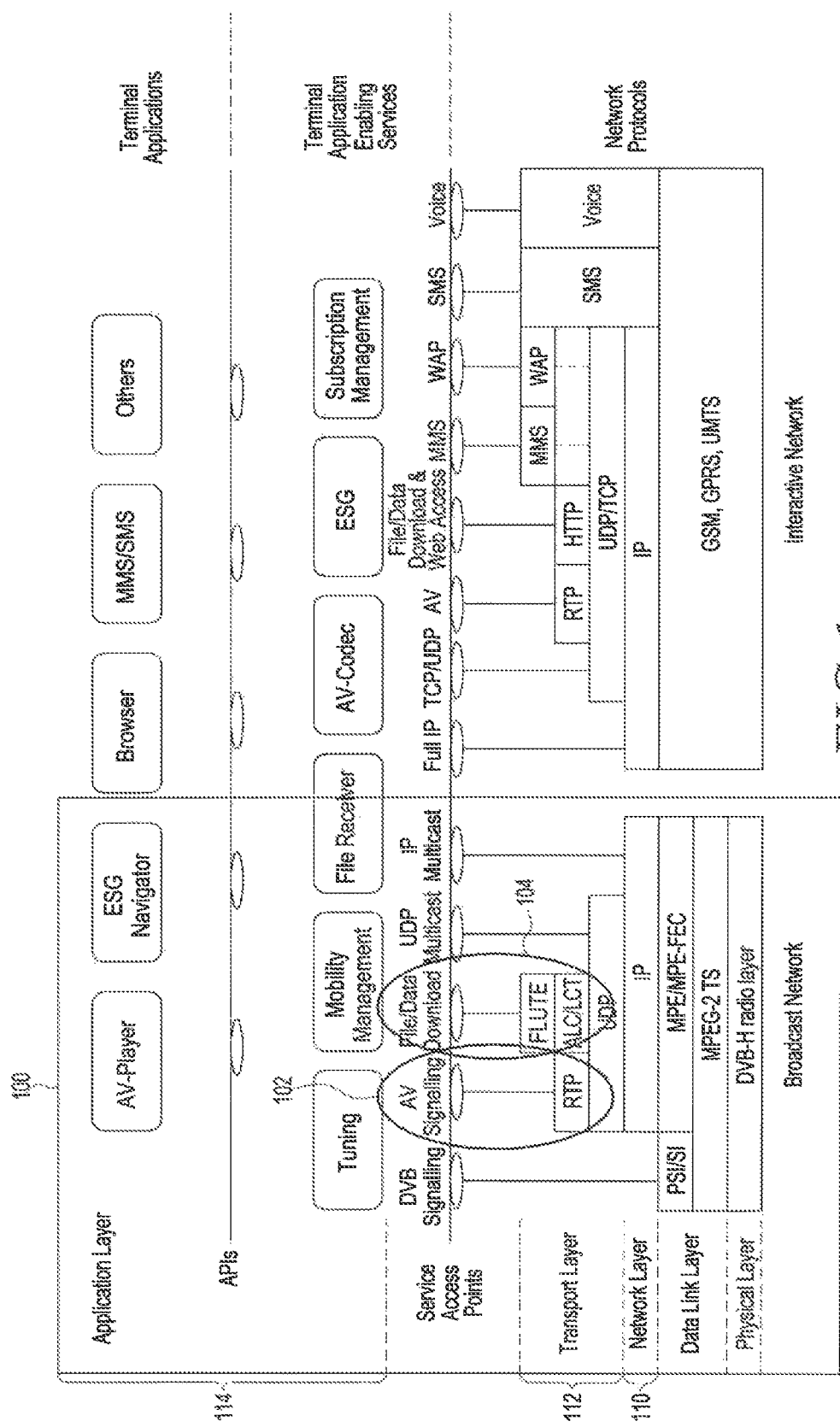
FIG. 1 illustrates an example of a protocol information configuration defined for each service component in a general Internet protocol (IP) broadcasting network service.

Hereinafter, the operating principles of exemplary embodiments of the present disclosure will be described with reference to the accompanying drawings. Like components are referred to as like reference numerals even through being illustrated in different drawings, and in the following description, a detailed description of related well-known functions or configurations will not be provided if it unnecessarily obscures the subject matter of the present disclosure. Further, the terminologies to be described below are defined in consideration of functions in the present disclosure and may vary depending on a user's or operator's intention or practice. Therefore, the definitions should be made based on the contents throughout the entire description of the present disclosure.

Hereinbelow, a broadcasting system according to an embodiment of the present disclosure uses a plurality of transport protocols, and clearly separately uses a protocol for each purpose, such as a protocol for contents transmission, a protocol for file transmission, and so forth. For example, a hybrid broadcasting system such as the Advanced Television System Committee (ATSC) 3.0 may employ a plurality of transport techniques such as an MPEG media transport (MMT) protocol or a real-time object delivery over unidirectional transport (ROUTE) file delivery over unidirectional transport (FLUTE) as an application transport protocol. Like the FLUTE among media transport protocols, the ROUTE protocol is a transport protocol specialized for transmission of data in the form of a file rather than real-time A/V media data. In an embodiment of the present disclosure, for convenience, an ATSC 3.0-based broadcasting system will be described as an example. However, an embodiment of the present disclosure is also applicable to other systems than the ATSC 3.0.

Hereinafter, an embodiment of the present disclosure proposes a method and apparatus for transmitting and receiving a service by using a plurality of protocols in a broadcasting system. Hence, a transmission apparatus according to an embodiment of the present disclosure delivers a service provided by a broadcasting system and service-related information including signaling information needed for reception of the service to a reception side. The service-related information according to an embodiment of the present disclosure may include services provided by the broadcasting system and a bootstrap of signaling information for obtaining and discovering service components of each service, and may include, for example, protocol information mapped to each service, etc. The reception apparatus according to an embodiment of the present disclosure then receives the service-related information transmitted from the transmission apparatus, receives signaling information for receiving a service based on the service-related information, identifies protocol information mapped to each service based on the signaling information, and receives a corresponding service. More specifically, according to an embodiment of the present disclosure, in a broadcasting system, the transmission apparatus maps a proper protocol to each service or service component, configures service-related information with information about a protocol mapped to a service or service component, and delivers the service-related information to the reception apparatus. An embodiment of the present disclosure proposes multiple embodiments about schemes for delivering service-related information to the reception apparatus. For example, the service-related information according to an embodiment of the present disclosure may be transmitted using electronic program guide (EPG) information that may be checked by other means than a broadcasting network, e.g., an e-mail, Internet, a universal serial bus (USB), installation of a separate application, etc., or using session description protocol (SDP) session information. The service-related information may be transmitted through a user datagram protocol (UDP)/IP packet header, using link layer signaling, or using high-layer signaling information delivered over a broadcasting network.

Figure 8:
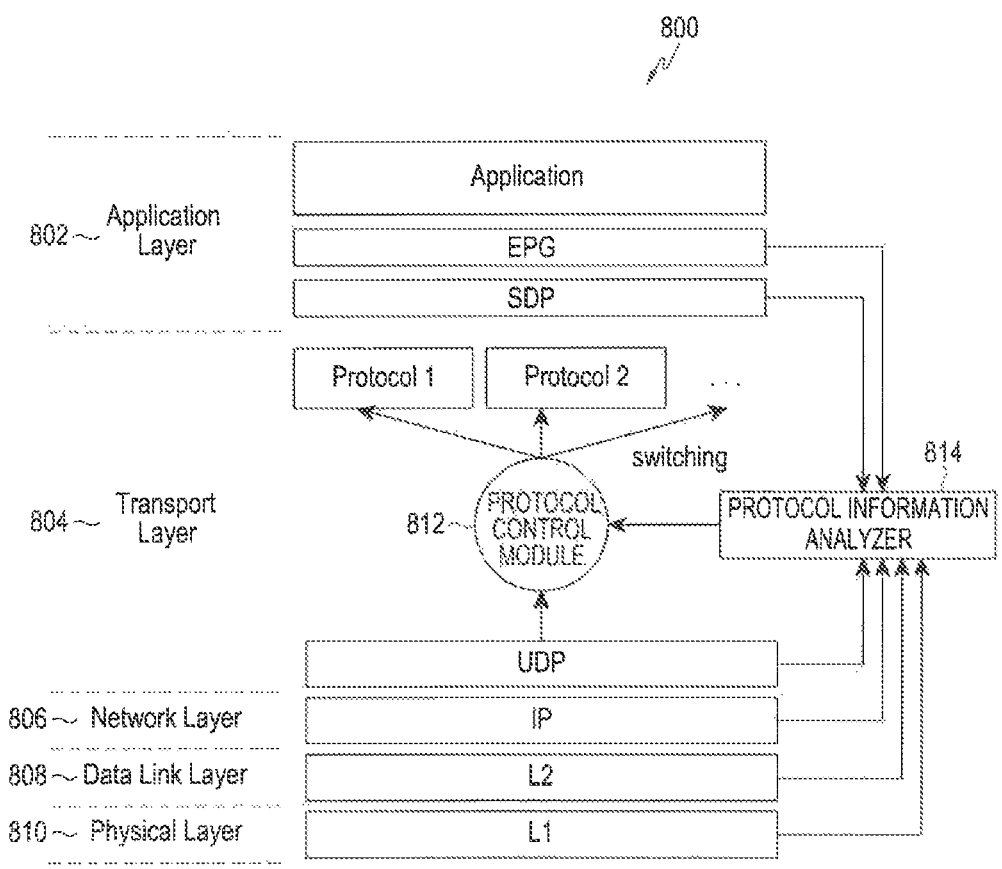
FIG. 8 is a diagram of a receiver according to an embodiment of the present disclosure.
Figure 15:
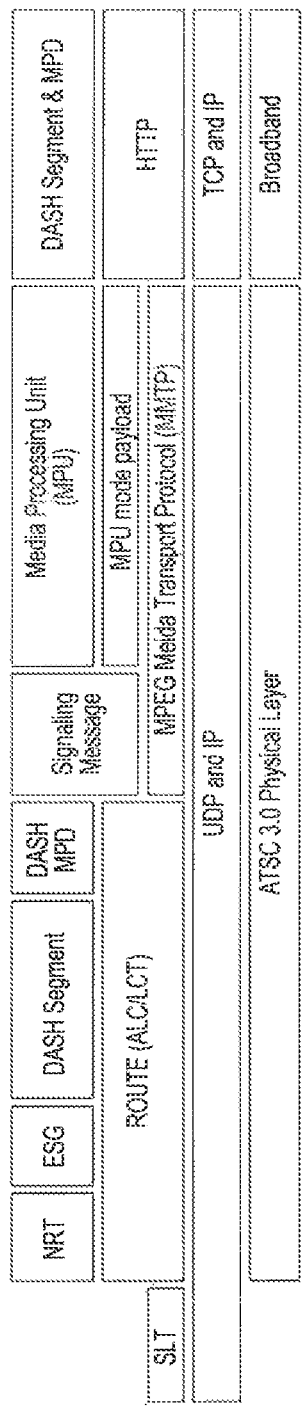
FIG. 15 illustrates an example of a protocol stack to which two transport techniques, MMT and ROUTE, according to an embodiment of the present disclosure are applied.

More specifically, referring to FIG. 1 for convenience, a protocol stack in a broadcasting system according to an embodiment of the present disclosure may include a network layer 110 processing IP packets, a transport layer 112 including a protocol stack including various protocols, signaling information for receiving each service/service component, e.g., service-related information including protocol information for identifying a protocol mapped to each service/service component, and an application layer 114 that receives a packet processed in each protocol and delivers the packet to a user in the form of a service. The protocol stack of the transport layer 112 may include an MMT protocol and a ROUTE protocol. Referring to a protocol stack at a reception side shown in FIG. 15, a transport layer for a service received by the reception side includes the MMT protocol and the ROUTE protocol. Referring to FIG. 15, a UDP/IP packet multicast by a broadcasting physical layer (ATSC 3.0 Physical Layer) is mapped to the MMT protocol or the ROUTE protocol. A packet transmitted from the transmission apparatus using the MMT protocol is identified by signaling information corresponding to data and control information. The data may be included in a packet based on a data structure of a media processing unit (MPU) including an independently-decodable minimum unit of a media content transmitted using the MMT protocol. The data structure of the MPU may be a media fragment unit (MFU) that corresponds to each of images of video if the media content is the video. The MPU is included in packets corresponding to each service component of the same service, and the video is defined as an asset in an MMT-based technique. The MMT protocol packet that delivers the same asset is assigned the same packet identifier. Thus, MPUs of the packet are also assigned the same packet identifier. The data may be received in the form of a payload in an MPU mode. Meanwhile, in case of the ROUTE protocol, it is defined that streaming content formatted by a dynamic adaptive streaming over hypertext transfer protocol (HTTP) (DASH) is delivered through broadcasting. Thus, a packet transmitted from the transmission apparatus using ROUTE is identified by signaling information corresponding to data and control information, and the data is received through the packet in the unit of an object produced by dividing media content into predetermined units. For example, the object may be received in the form of a DASH segment defined as a media segment through the packet, and the signaling information may be received in the form of a medial presentation description (MPD) through the packet. The DASH MPD may indicate, for example, a timeline of DASH segments, etc. In an embodiment of the present disclosure, the transmission apparatus transmits service-related information including signaling information for receiving a service/service component to the reception side. The service-related information according to an embodiment of the present disclosure may be periodically transmitted at intervals preset by an operator or a user before a broadcasting service is provided. The service-related information may be updated according to a change of a channel environment, a user's request, and so forth, and the updated service-related information may also be transmitted before the broadcasting service is provided. The transmission apparatus transmits each UDP/IP packet corresponding to a service or service component to the reception side using a protocol mapped to the service or service component. Herein, the signaling information included in the service-related information may include protocol information for identifying a service/service component configured with a different protocol. More specifically, the protocol information may include a protocol indicator according to an embodiment of the present disclosure. According to an embodiment, the service-related information may further include a protocol change indicator indicating a case where a protocol of a service/service component is changeable and a changed protocol indicator. More specifically, the transmission apparatus according to an embodiment of the present disclosure may configure the service-related information such that the service-related information includes IP/port information mapped to each service information and protocol information of each UDP packet. According to an embodiment, the transmission apparatus may configure the service-related information by additionally mapping protocol change information to each service information. According to an embodiment, the transmission apparatus may configure the service-related information such that the service-related information includes IP/port information, a protocol indicator, and protocol change information which are mapped to each real-time service component of the same service. In this case, for example, a protocol control module included in the reception apparatus configured as shown in FIG. 8 may obtain a protocol indicator or a protocol change indicator for each service/service component, which may be configured as described above, through the service-related information received from the transmission apparatus.

The protocol information used in an embodiment of the present disclosure may be designated in various units. Hereinbelow, in an embodiment of the present disclosure, the designated range of the protocol information will be configured based on a service or service component as an example. However, the designated range of the protocol information according to an embodiment of the present disclosure is not limited to the service unit/service component unit.

First, according to an embodiment of the present disclosure, the designated range of the protocol information may be set to a service unit. In this case, for convenience, it is assumed that different protocols are designated for a plurality of services at a service level, respectively. Herein, a service may correspond to an independent content such as a movie, news, a drama, radio, a file, etc. The transmission apparatus may transmit service-related information including protocol information mapped to each service to the reception side. The transmission apparatus then transmits a packet of a service to the reception side using a protocol mapped to the service. For example, suppose that a different protocol for a broadcasting service provided by a different broadcaster is used. If the broadcaster is the Korean Broadcasting System (KBS), the KBS is assumed to transmit broadcasting content using the MMT protocol; if the broadcaster is the Moonhwa Broadcasting Center (MBC), the MBC is assumed to transmit broadcasting content using the ROUTE protocol. In this case, for the reception side to receive a broadcasting service transmitted from each broadcaster, the transmission apparatus needs to configure service-related information including protocol information for identifying a protocol with which the broadcasting service of each broadcaster is configured and to transmit the configured service-related information to the reception side. Thus, the transmission side may configure the service-related information including the protocol information mapped to the broadcasting service provided by each broadcaster as shown in Table 1, for example. The service-related information may be configured to be included in an EPG corresponding to a function of showing a program schedule on a TV screen. Referring to Table 1, the service-related information according to an embodiment of the present disclosure may include service identification information corresponding to the service information, an IP address corresponding to IP/port information, and a protocol indicator corresponding to the protocol information. To be more specific, if the service identification information indicates the KBS, an IP address '111.111.111.111' and a protocol indicator 'MMT' are mapped. It means that the broadcasting service provided by the KBS is transmitted to the reception side using the MMT protocol through the IP address '111.111.111.111'. Meanwhile, if the service identification information indicates the MBC, an IP address '222.222.222.222' and a protocol indicator 'ROUTE' are mapped. It means that the broadcasting service provided by the MBC is transmitted to the reception side using the ROUTE protocol through the IP address '222.222.222.222'. Thus, if the reception side receives the service-related information configured as shown in Table 1, the reception side checks an IP address of an IP packet header of the received service when a transport layer of the reception side delivers an IP packet to a protocol stack. Assuming that the checked IP address is '111.111.111.111', the transport layer of the reception side delivers the IP packet of the received service to an MMT protocol stack to which the checked IP address is mapped based on the service-related information. If the checked IP address is '222.222.222.222', the transport layer of the reception side delivers the IP packet of the received service to a ROUTE protocol stack to which the checked IP address is mapped based on the service-related information.

TABLE 1

| Service Identification Information | IP Address | Protocol Indicator |
|---|---|---|
| KBS | 111.111.111.111 | MMT |
| MBC | 222.222.222.222 | ROUTE |
| ... | ... | ... |

Table 2 shows an example where protocol information included in service-related information according to an embodiment of the present disclosure is expressed in the form of a protocol indicator mapped to each protocol type.

TABLE 2

| Protocol Indicator | Used Protocol |
|---|---|
| 0 | MMT |
| 1 | ROUTE |
| 2 | FLUTE |
| 3 | RTP |
| ... | ... |
|  | FOR FUTURE USE |

Referring to Table 2, the protocol indicator may be defined in the form of a number indicating a protocol. That is, the MMT protocol is indicated by '0', and the ROUTE protocol is indicated by '1'. Thus, in case of the service-related information configured as shown in Table 1, the protocol indicator mapped to the KBS is expressed with '0' corresponding to the MMT protocol, and the protocol indicator mapped to the MBC is expressed with '1' corresponding to the ROUTE protocol. However, the numeric expression of the protocol indicator according to an embodiment of the present disclosure is merely an example, and the protocol indicator is not limited to the numeric expression.

Next, according to an embodiment of the present disclosure, the designated range of the protocol information may be set to a service component unit. In this case, in an embodiment of the present disclosure, service components of the same service may be configured with different protocols depending on characteristics of each service component. For example, when a service corresponding to a particular movie provided by an operator is provided, service components of the movie may correspond to country-specific subtitles, audio contents, and video contents of the movie, respectively. In this case, the transmission apparatus may transmit service-related information including protocol information mapped to each service component of the same service to the reception side. By using a protocol mapped to each service component, the transmission apparatus transmits a packet of the service component to the reception side. For example, it is assumed that service components corresponding to AV streaming and file data of the same broadcasting service are configured with the MMT protocol and the ROUTE protocol, respectively. In this case, the service components of the same service have the same IP address, but different port information. Thus, the transmission apparatus configures service-related information including service identification information and each service component identification information, which correspond to service information, IP address and port information corresponding to IP/port information, and a protocol indicator corresponding to protocol information as shown in Table 3, and transmits the service-related information to the reception side.

TABLE 3

| Service Identification Information | Service Component Identification Information | IP Address | Port Address | Protocol Indicator |
|---|---|---|---|---|
| KBS | AV Streaming | 111.111.111.111 | 3 | MMT |
|  | File Data |  | 4 | ROUTE |
| MBC | AV Streaming | 222.222.222.222 | 3 | MMT |
|  | File Data |  | 4 | ROUTE |
| ... | ... | ... | ... | ... |

Referring to Table 3, the service-related information according to an embodiment of the present disclosure may be configured by mapping an IP address, a port address, and a protocol indicator for each service component, included in each service identification information. More specifically, if the service identification information indicates the MBC, service components of a broadcasting service provided by the MBC correspond to AV streaming and file data, respectively, and have the same IP address '222.222.222.222', but different port addresses and protocol identifiers. That is, to the AV streaming, a port address '3' and the protocol indicator 'MMT' are mapped, whereas to the file data, a port address '4' and the protocol indicator 'ROUTE' is mapped.

Meanwhile, for the same service including a plurality of service components, the service component may be transmitted using different protocols depending on environment and service characteristics supported by the service component.

Table 4 shows an example of service-related information indicating a case where the same service component in the same service uses several protocols.

TABLE 4

| Service Identification Information | Service Component Identification Information | IP Address | Port Number | Protocol Indicator |
|---|---|---|---|---|
| KBS | Video | 111.111.111.111 | 1 | MMT |
|  | Audio |  | 2 | MMT |

TABLE 4-continued

| Service Identification Information | Service Component Identification Information | IP Address | Port Number | Protocol Indicator |
|---|---|---|---|---|
|  | File data |  | 3 | MMT |
|  | ... |  | ... | MMT |
|  | Video |  | 11 | Route |
|  | Audio |  | 12 | Route |
|  | File data |  | 13 | Route |
|  | ... |  | ... | Route |

Referring to Table 4, a broadcasting service corresponding to service identification information 'KBS' is assumed to include service components of video, audio, and file data. In this case, the service components using the same IP address may be divided into some having the protocol indicator 'MMT' and others having the protocol indicator 'ROUTE'. The reception side may be provided with a personal or seamless service by changing a protocol of a service component provided by the KBS based on the service-related information configured as shown in Table 4 due to user's selection or a change of a surrounding service environment.

Suppose the reception side is provided with an audio or data file configured with the ROUTE protocol for a currently viewed broadcasting service. In this case, if the user desires to change the language of the broadcasting service into another language, the transmission apparatus may transmit an audio or data file corresponding to the another language after changing the protocol to the MMT protocol for real-time synchronization with video of the broadcasting service. The transmission apparatus then configures the service-related information including protocol change information of the broadcasting service and transmits the configured service-related information to the reception side. The transmission apparatus may deliver the service-related information including the protocol change information to the reception side by using, for example, EPG information, by using L2 signaling for faster real-time correspondence, or through an IP packet header. According to an embodiment, the transmission apparatus may transmit a changed port number corresponding to an IP packet of an audio or data file changed to another language for the same service to the reception side through the service-related information. The reception side then checks a protocol indicator corresponding to the changed port of the audio or data file from previously received service-related information, thus identifying a protocol of the changed audio or data.

Table 5 shows an example of service-related information including protocol change information according to an embodiment of the present disclosure.

TABLE 5

| Service Identification Information | Service Component Identification Information | Previous Protocol Indicator | Protocol Change Indicator | Changed Protocol Indicator | |
|---|---|---|---|---|---|
| KBS | Video | 01 | 1 | 11 | 00(MMT) 01(ROUTE) 10(RTP) 11(Protocol4) |
|  | Audio | 01 | 0 | 01 | |
| MBC | Video | 00 | 1 | 10 | |
|  | Audio | 00 | 1 | 11 | |

Referring to Table 5, if the broadcaster is the KBS, for a video component, a protocol change indicator indicates that a protocol is changed. Thus, a previous protocol indicator of the video component is '01' indicating the ROUTE protocol, whereas the changed protocol indicator is '11' indicating Protocol 4. On the other hand, for an audio component provided by the KBS, the protocol change indicator indicates that the protocol is not changed. Thus, both a previous protocol indicator and a changed protocol indicator of the audio component are '10' indicating the ROUTE protocol.

Figure 2A:
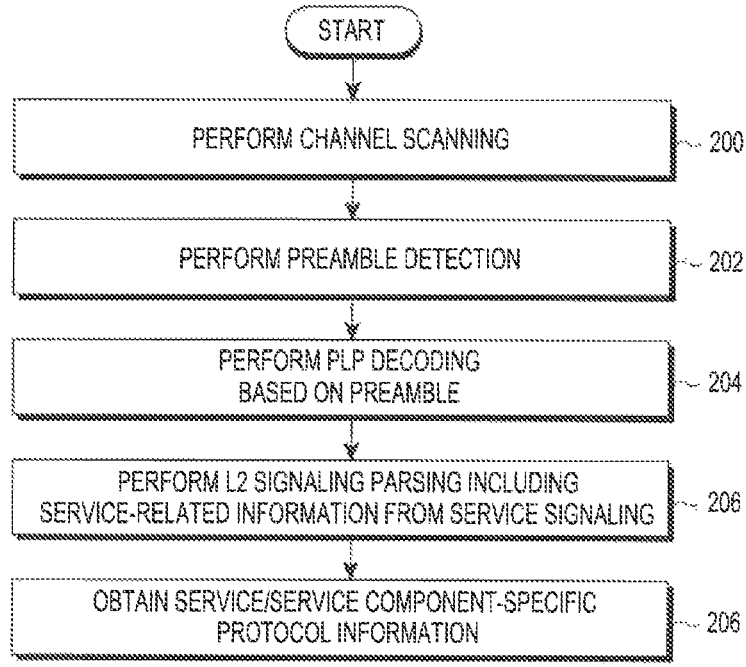
FIG. 2A is a flowchart of operations when a reception apparatus according to an embodiment of the present disclosure receives service-related information according to an embodiment of the present disclosure through L2 signaling while performing channel scanning.
Figure 2B:
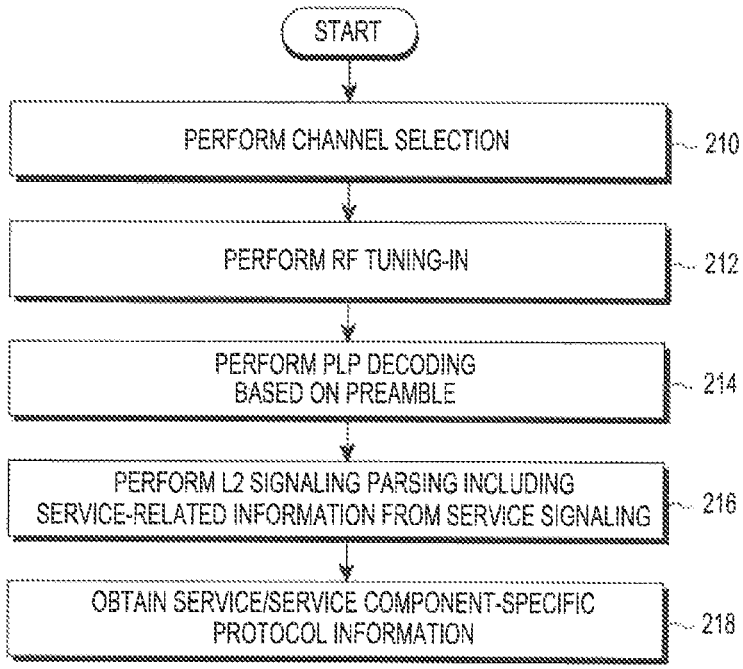

According to an embodiment of the present disclosure, when service-related information including protocol change information is transmitted to the reception side through a high-layer signal such as an EPG, etc., an EPG transmission interval is merely several seconds, and the changed protocol information is difficult to in real-time update in the EPG provided to the reception side. Therefore, according to another embodiment, the transmission apparatus transmits protocol change information of a service/service component through L2 signaling information, etc., whereby the transmission apparatus may notify the reception side of changed protocol information for each service/service component (or service/service component-specific changed protocol information) on a real-time basis. Moreover, according to another embodiment of the present disclosure, to indicate the changed protocol information for the service/service component through L2 signaling, a protocol indicator or a changed protocol indicator of the service or service component may be transmitted through a header or payload of an L2 packet. According to another embodiment, protocol or changed protocol information of a service or service component may be transmitted to the reception side through a dedicated signaling message. FIGS. 2A and 2B are flowcharts of operations of a reception apparatus according to an embodiment of the present disclosure. FIG. 2A is a flowchart of operations when a reception apparatus according to an embodiment of the present disclosure receives service-related information according to an embodiment of the present disclosure through L2 signaling while performing channel scanning FIG. 2B is a flowchart of operations when a reception apparatus according to an embodiment of the present disclosure receives service-related information according to an embodiment of the present disclosure if performing channel switchover, or performing channel selection upon powered on.

Referring to FIG. 2A, in a current embodiment, the transmission apparatus is assumed to deliver service-related information including service/service component-specific protocol information to the reception apparatus through L2 signaling information. In this case, if the reception apparatus, for example, a TV is powered on, the reception apparatus performs initial channel scanning in operation 200. The reception apparatus obtains the service-related information according to an embodiment of the present disclosure through the initial channel scan. The reception apparatus detects a preamble through the initial channel scanning in operation 202, and performs physical layer pipe (PLP) decoding based on the obtained service-related information and the detected preamble in operation 204. The reception apparatus decodes signaling information obtained from the obtained service-related information to obtain information for receiving a service, for example, a radio frequency (RF) channel, a PLP identifier, etc., in operation 206. The reception apparatus according to an embodiment of the present disclosure performs RF tuning-in by using the service-related information and performs PLP selection corresponding to the service, and performs L2 signaling parsing in operation 206. In L2 signaling parsing, the reception apparatus obtains protocol information of signaling information required for service reception, service/service component-specific protocol information from the service-related information according to an embodiment of the present disclosure. The service-related information may include bootstrap information regarding an ESG, an EPG, SDP session information, etc.

Referring to FIG. 2B, for convenience, the reception apparatus is assumed to be, for example, a TV. In this case, in operation 210, the reception apparatus is assumed to perform channel selection upon powered on or to perform channel switchover. The reception apparatus has already obtained the service-related information through the initial channel scanning and has already obtained the signaling information for receiving a service received in a selected channel from the service-related information, for example, the RF channel information, the PLP identifier, etc. Thus, in operation 212, the reception apparatus performs RF tuning-in by using the RF channel information corresponding to the selected channel, etc. In operation 214, the reception apparatus detects a preamble of the selected channel, selects a PLP of the service based on the service-related information, and decodes the selected PLP. In operation 216, the reception apparatus performs L2 signaling information parsing. In L2 signaling information parsing, the reception apparatus obtains protocol information of signaling information required for service reception, service/service component-specific protocol information from the service-related information according to an embodiment of the present disclosure. The service-related information may include bootstrap information regarding an ESG, an EPG, SDP session information, etc.

As such, the service-related information including the service/service component-specific protocol information or the changed protocol information according to an embodiment of the present disclosure may be transmitted in various ways according to an embodiment.

More specifically, the transmission apparatus according to an embodiment of the present disclosure may be delivered through an EPG delivered out-of-band (OoB) instead of over a broadcasting network. In this case, the transmission apparatus according to an embodiment of the present disclosure delivers EPG data including service-related information according to an embodiment of the present disclosure to the reception side, e.g., a broadcasting receiving terminal through a separate third delivery channel corresponding to the OoB manner, e.g., an e-mail, USB delivery, separate application installation, an Internet channel, etc. In this case, the service-related information according to an embodiment of the present disclosure may include protocol information or changed protocol information applied to transmission based on a different service for a different broadcaster, e.g., the KBS, the MBC, etc., or based on a service component corresponding to video, audio, a generic file, etc. In this case, the protocol information or the changed protocol information according to an embodiment of the present disclosure is transmitted through a separate third channel other than a channel through which broadcasting data information is transmitted, without causing, for example, a transmission error that affects capabilities of a broadcasting signal, etc. In this case, the transmission apparatus transmits the EPG before transmitting broadcasting data, making it difficult to reflect the changed protocol information in real time. For example, if the transmission apparatus transmitting video of news broadcasting of the KBS channel with the RTP transmits the video of the news broadcasting midway when necessary by replacing the RTP with another protocol such as the MMT, etc., it is not easy for the transmission apparatus to update the changed protocol information through the EPG and transmit the changed protocol information to the reception side.

Table 6 shows an example where a protocol indicator is inserted into each service/service component in an ESG according to an embodiment of the present disclosure.

TABLE 6

```
<ESGMain xmlns="urn:dvb:ipdc:esg:2005"xmlns:mpeg7="urn:mpeg:mpeg7:schema:2001'
    xmlns:tva="urn:tva:metadata:2005"  xmlns:xsi="http://www.w3.org/2001/XMLSchema-
    instance">
        <ESG>
        *********.
<ServiceTable>
<Service serviceID="dvbipdc://example.com/Channel1">
<ServiceName>Channel1</ServiceName>
<AcquisitionRcf IDRcf- "dvbipdc://example.com/Acquisition/Channel1" />
</Service>
</ServiceTable>
<AcquisitionTable>
    <Acquisition contentMimeType="video/H264"
```

TABLE 6-continued

```
            acquisitionID="dvbipdc://example.com/Acquisition/Channel1" >
            <ComponentDescription>
            <ComponentCharacteristic xsi: type="VideoComponentType">
                <CodecCharacteristic>
                  <Codec href="urn:dvb:cs:VideoCodecCS:2006:1.1.2"/>
                </CodecCharacteristic>
                <FrameRate>25</FrameRate>
                <Protocolindicator>MMT</Protocolindicator>
            </ComponentCharacteristic>
            <ComponentCharacteristic xsi:type="AudioComponentType">
                  <Codec href=" urn:dvb:cs:AudioCodecCS:2006:1.3.2"/>
                <Language>en</Language>
                <Protocolindicator>Route</Protocolindicator>
            </ComponentCharacteristic>
            <SessionDescription xsi:type="SDPRefType" >
            </SessionDescription>
         </ComponentDescription>
       </Acquisition>
</Acquisition Table>
    *********.
    </ESG>
    </ESGMain>
```

Referring to Table 6, a service 'Channel 1' includes a service component of each of H.264-based video and audio, a rate of a service component corresponding to the video is 25 frames, and an example of transmission with the MMT protocol is shown. Likewise, a service component corresponding to the audio is transmitted with the ROUTE protocol.

Figure 3:
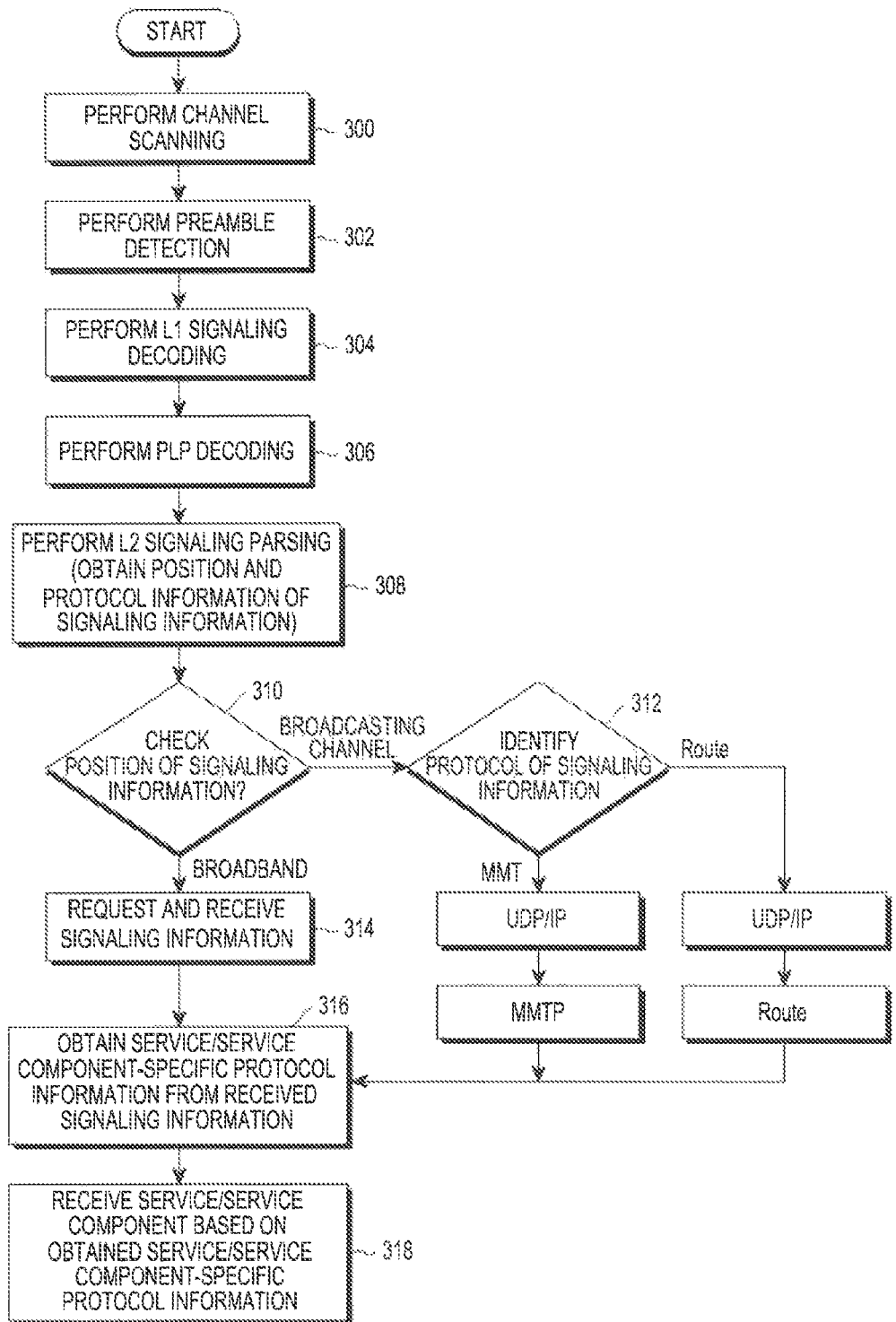
FIG. 3 is an example of a flowchart of operations of delivering, by a transmission side, service-related information to a reception apparatus through L2 signaling information according to an embodiment of the present disclosure.
Figure 4:
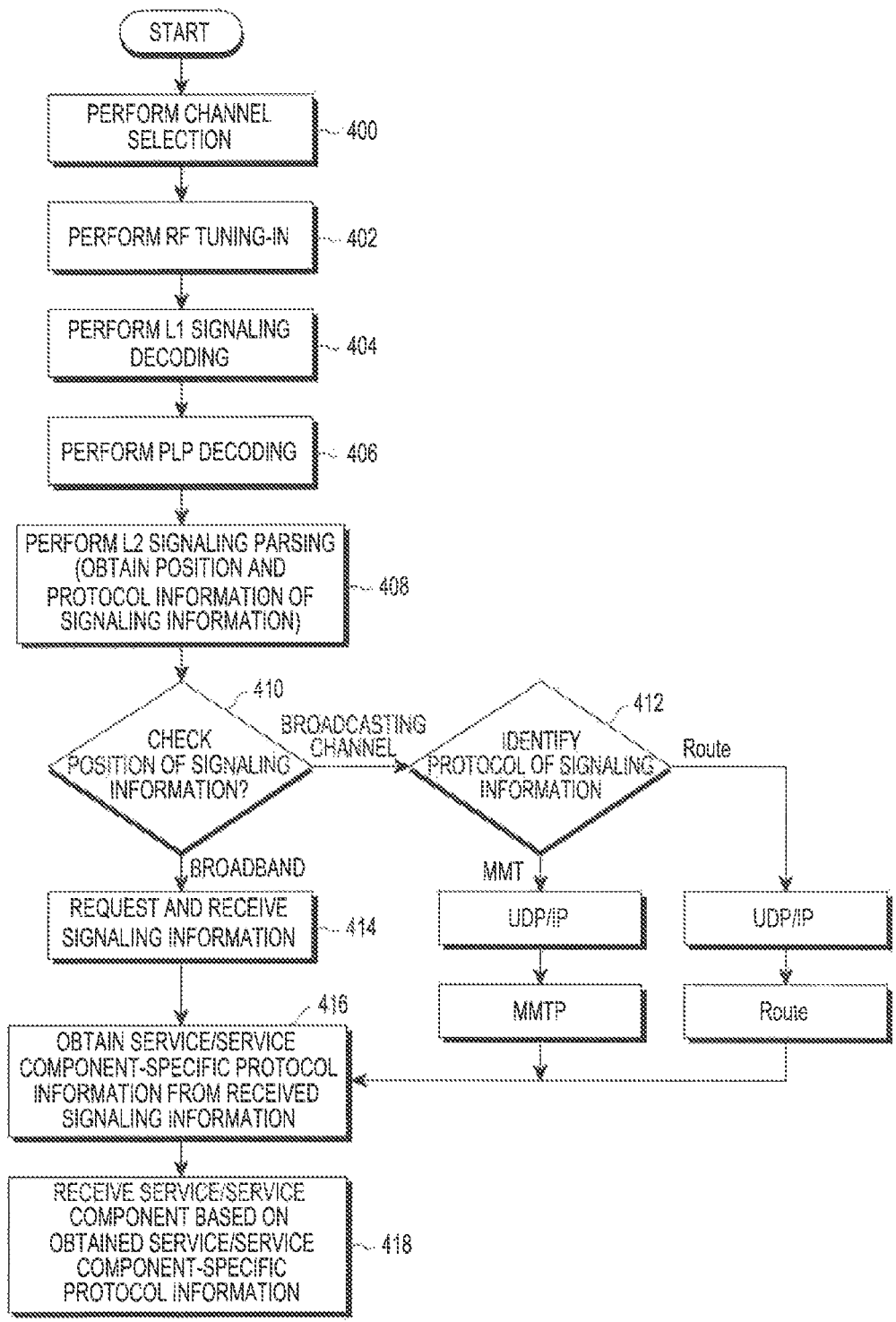
FIG. 4 is another example of a flowchart of operations of delivering, by a transmission side, service-related information to a reception apparatus through L2 signaling information according to an embodiment of the present disclosure.

Referring to FIGS. 3 and 4, a description will be made of operations of the reception apparatus when the service-related information according to an embodiment of the present disclosure is delivered to the reception side using the OoB manner. More specifically, the embodiment of FIGS. 3 and 4 corresponds to a flowchart of operations of the reception side when the service-related information according to an embodiment of the present disclosure is transmitted in the OoB manner or through a broadcasting channel.

FIG. 3 is another example of a flowchart of operations of a reception apparatus according to an embodiment of the present disclosure. In the embodiment of FIG. 3, it is assumed that the transmission side delivers service-related information according to an embodiment of the present disclosure to the reception apparatus through L2 signaling information. The service-related information includes protocol information for receiving signaling information required for service reception (hereinafter, referred to as 'protocol information of signaling information') and service/service component-specific protocol information. The service-related information may be transmitted through the ESG, the EPG, the SDP session information, etc., or transmitted in the OoB manner to the reception side. Thus, the service-related information according to an embodiment of the present disclosure may include bootstrap information about the ESG, the EPG, the SDP session information, etc., and bootstrap information of service signaling information of the service-related information delivered to the reception side, for example, in the OoB manner, such as in a broadband. Referring to FIG. 3, when the reception apparatus, for example, a TV is powered on, the reception apparatus performs initial channel scanning in operation 300. The reception apparatus obtains the service-related information according to an embodiment of the present disclosure through the initial channel scanning. In operation 302, the reception apparatus detects a preamble. In operation 304, the reception apparatus decodes L1 signaling based on the detected preamble.

The reception apparatus selects a PLP obtained from the decoded L1 signaling and decodes the selected PLP in operation 306, and performs L2 signaling parsing in operation 308. In L2 signaling parsing, the reception apparatus obtains a position of signaling including bootstrap information for receiving signaling information and a type of a transport protocol of the signaling information, etc., from the service-related information according to an embodiment of the present disclosure. The signaling position may include the bootstrap information regarding, e.g., the ESG, the EPG, the SDP, etc., if the signaling information for service reception is received through a broadcasting channel, or may include high-layer bootstrap information if the signaling information for service reception is received through OoB information. The signaling position may be indicated by an IP address or a port number and a protocol indicator, etc., for transmission of the signaling information.

Thus, in operation 310, the reception apparatus determines whether the obtained signaling position is OoB or in a broadcasting channel. If the signaling information is received in the OoB manner, e.g., in the broadband, the reception apparatus goes to operation 314. In operation 314, the reception apparatus requests signaling information of a service by using bootstrap information corresponding to the signaling position, e.g., a uniform resource locator (URL), receives the signaling information, and parses the signaling information. In operation 316, the reception apparatus obtains service/service component-specific protocol information from the received signaling information. In operation 318, the reception apparatus obtains, from the service/service component-specific protocol information, a protocol indicator or a changed protocol indicator for each service or service component desired to be received, and delivers the service/service component received based on the obtained protocol indicator to a protocol stack.

If it is determined in operation 310 that the signaling information is received through the broadcasting channel, the reception apparatus goes to operation 312. In operation 312, the reception apparatus obtains the bootstrap information regarding the ESG, the EPG, the SDP, etc., from the signaling position for the reception through the broadcasting channel, and delivers the signaling information to a protocol stack based on the obtained bootstrap information to parse the signaling information. In this case, a protocol of the signaling information may include one of the MMT protocol and the ROUTE protocol. The reception apparatus obtains the service/service component-specific protocol information from the signaling information in operation 316, and performs operation 318 based on the obtained protocol information.

FIG. 4 is another example of a flowchart of operations of a reception apparatus according to an embodiment of the present disclosure. In the embodiment of FIG. 4, it is assumed that the transmission side delivers service-related information according to an embodiment of the present disclosure to the reception apparatus through L2 signaling information. The service-related information may include protocol information of signaling information and service/service component-specific protocol information. The service-related information may be transmitted through the ESG, the EPG, the SDP session information, etc., or transmitted in the OoB manner to the reception side. Thus, the service-related information according to an embodiment of the present disclosure may include bootstrap information about the ESG, the EPG, the SDP session information, etc., and bootstrap information of service signaling information of the service-related information delivered to the reception side, for example, in the OoB manner, such as in a broadband.

Referring to FIG. 4, in operation 400, it is assumed that channel selection is performed as the reception apparatus, e.g., the TV is powered on or upon channel switchover. From service-related information for receiving a service already received in a channel selected through the initial channel scanning performed as soon as the reception apparatus is powered on, for example, the RF channel information, the PLP identifier, etc., have been obtained. Thus, in operation 402, the reception apparatus receives the service by performing RF tuning-in with the RF channel information corresponding to the selected channel, etc.

In operation 404, the reception apparatus decodes the L1 signaling. In operation 406, the reception apparatus selects a PLP of the service, obtained from the decoded L1 signaling, and decodes the selected PLP. In operation 408, the reception apparatus performs L2 signaling parsing. In L2 signaling parsing, the reception apparatus obtains a position of signaling including bootstrap information for receiving signaling information and a type of a transport protocol of the signaling information, etc., from the service-related information according to an embodiment of the present disclosure. More specifically, the signaling position may include the bootstrap information regarding, e.g., the ESG, the EPG, the SDP, etc., if the signaling information for service reception is received through a broadcasting channel, or may include high-layer bootstrap information if the signaling information is received in the OoB manner. The signaling position may be indicated by an IP address or a port number and a protocol indicator, etc., for transmission of the signaling information.

Thus, in operation 410, the reception apparatus determines whether the obtained signaling position is OoB or in a broadcasting channel. If determining that the signaling information is received in the OoB manner, for example, in the broadband, the reception apparatus requests and receives the signaling information by using bootstrap information corresponding to the signaling position, e.g., a URL, and parses the signaling information. In operation 416, the reception apparatus obtains service/service component-specific protocol information from the signaling information. In operation 418, the reception apparatus obtains, from the service/service component-specific protocol information, a protocol indicator or a changed protocol indicator for each service or service component desired to be received, and receives the service/service component based on the obtained protocol indicator.

If determining that the signaling information is received through the broadcasting channel in operation 410, in operation 412, the reception apparatus obtains the bootstrap information regarding the ESG, the EPG, the SDP, etc., from the signaling position for the reception through the broadcasting channel, and delivers the signaling information to a protocol stack based on the obtained bootstrap information. In this case, a protocol of the signaling information may include one of the MMT protocol and the ROUTE protocol. The reception apparatus obtains service/service component-specific protocol identification information from the signaling information in operation 416, and goes to operation 418.

The transmission apparatus according to an embodiment of the present disclosure may also deliver service-related information through SDP session information. More specifically, in an embodiment where the transmission apparatus delivers the service-related information through the SDP session information, the service-related information according to an embodiment of the present disclosure may be inserted into SDP session information used for session establishment between a transmission end and a reception end using various protocols, and may be transmitted through the SDP session information. In this case, the service-related information may include protocol information or changed protocol information applied to service-based or service-component-based transmission. Thus, the reception apparatus may receive the SDP session information according to an embodiment of the present disclosure and identify real-time change of protocol information for each service/in a service component through the received SDP session information. An embodiment where the service-related information is transmitted through the SDP session information including the service-related information may be used when the use of additional bits in a reserved field of an EPG, an IP packet header, L2 signaling, etc., is not possible, or together with at least one method according to other embodiments.

Table 7 shows an example where service component-specific protocol information is included in the SDP session information according to an embodiment of the present disclosure.

Referring to Table 7, it is indicated by a protocol field of Media Descriptions ("m=") defined in the existing SDP that an element is 'MMT'. The m field of the SDP may designate a transport protocol of media based on a format "m=<media><port><proto><fmt> . . . ", and may designate the transport protocol of the media through a <proto> field among fields included in the format. In the example of Table 7, a video element of an SDP session is transmitted through a port 4002 and uses the MMT protocol. By extending an "a=" field indicating an attribute, a protocol change indicator may be proprietarily added to designate whether the transport protocol may be changed. In this case, the protocol change indicator '0' indicates that the transport protocol may not be changed. An audio element of the SDP session is transmitted through a port 4004 and uses the RTP protocol. Likewise, by extending the "a=" field indicating an attribute, a protocol change indicator may be proprietarily added to designate whether the transport protocol may be changed. In this case, the protocol change indicator '1' indicates that the transport protocol may be changed.

TABLE 7

```
v=0
o=ghost 2890844526 2890842807 IN IP4 192.168.10.10
s=IPDC SDP Example
i=Example of MMT streaming SDP file
u=http://www.example.com/ae600
e =ghost@mailserver.example.com
c=IN IP6 FF1E:03AD::7F2E:172A:1E24
t=3034423619 3042462419
b=AS:77
a=source-filter: incl IN IP6 * 2001:210:1:2:240:96FF:FE25:8EC9
a=min-buffer-time: 500
m=video 4002 MMT/AVP 96
b = TIAS: 62000
b =RR: 0
b =RS: 600
a= maxprate: 17
a=avg-br: 48000
a= rtpmap:96 H264/90000
a=fmtp:96 profile-level-id=42A01E; packetization-mode=1;
a=protocol-change-indicator: 0
sprop-parameter-sets =Z0IACpZTBY ml,aMljiA= =
m=audio 4004 RTP/AVP 98
b= TIAS: 15120
b =RR: 0
b =RS: 600
a =maxprate: 10
a= avg-br: 14000
a=rtpmap: 98 AMR/8000
a=fmtp: 98 octet-align=1
a=protocol-change-indicator: 1
```

Meanwhile, in another embodiment of the present disclosure, the transmission apparatus according to an embodiment of the present disclosure may transmit service-related information to the reception side through an UDP/IP packet header. More specifically, in an embodiment of the present disclosure, the transmission apparatus may transmit service-related information through an IP packet header or a UDP packet header. In this case, the service-related information may include protocol information or changed protocol information for each service or service component (or service/service component-specific protocol information or changed protocol information). When the service-related information is transmitted through the IP packet header or the UDP packet header, a protocol may be more flexibly changed in real time when compared to the embodiment where the service-related information is transmitted through the EPG. On the other hand, when a protocol of a service/service component is changed in the IP packet, a point in time when the protocol is actually changed may not coincide with a point in time when the service-related information indicating the change of the protocol is delivered. In this case, as a payload of the IP packet is delivered to a different high-layer protocol, service playback may not be possible.

Figure 17:
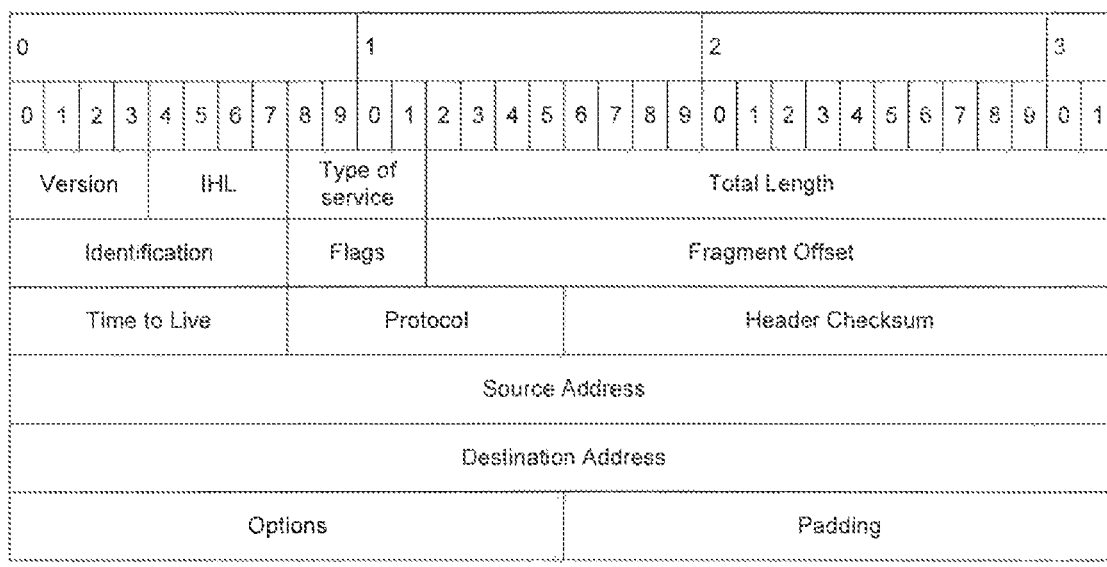
FIG. 17 is an illustration of a structure of a general IPv4 packet header according to an embodiment of the present disclosure.

FIG. 17 illustrates a structure of a general IPv4 packet header according to an embodiment of the present disclosure.

In the header illustrated in FIG. 17, a protocol field indicates information of a protocol used in a layer immediately higher than an IP. For example, if the protocol field is designated as '#17', it means that the protocol is a UDP, and if the protocol field is designated as '#6', it means that the protocol is a transmission control protocol (TCP). According to a given condition, the protocol field according to an embodiment of the present disclosure may be used after being extended to indicate a transport protocol used in a higher layer.

In an embodiment of the present disclosure, the transmission apparatus may also deliver the service-related information through L2 signaling. In this case, the transmission apparatus may transmit service-related information according to an embodiment of the present disclosure in various forms in a header of a separate dedicated L2 signaling message or L2 packet. Herein, the service-related information may include service/service component-specific protocol information or changed protocol information. When the service-related information according to an embodiment of the present disclosure is transmitted to the reception side through L2 signaling, protocol change information regarding a change of a protocol may be delivered to the reception side in a faster and more flexible manner than a case where the service-related information is transmitted through the ESG, the EPG, the SDP session information, or the IP header. On the other hand, the overall overhead of transmission signaling bits may increase.

Figure 5:
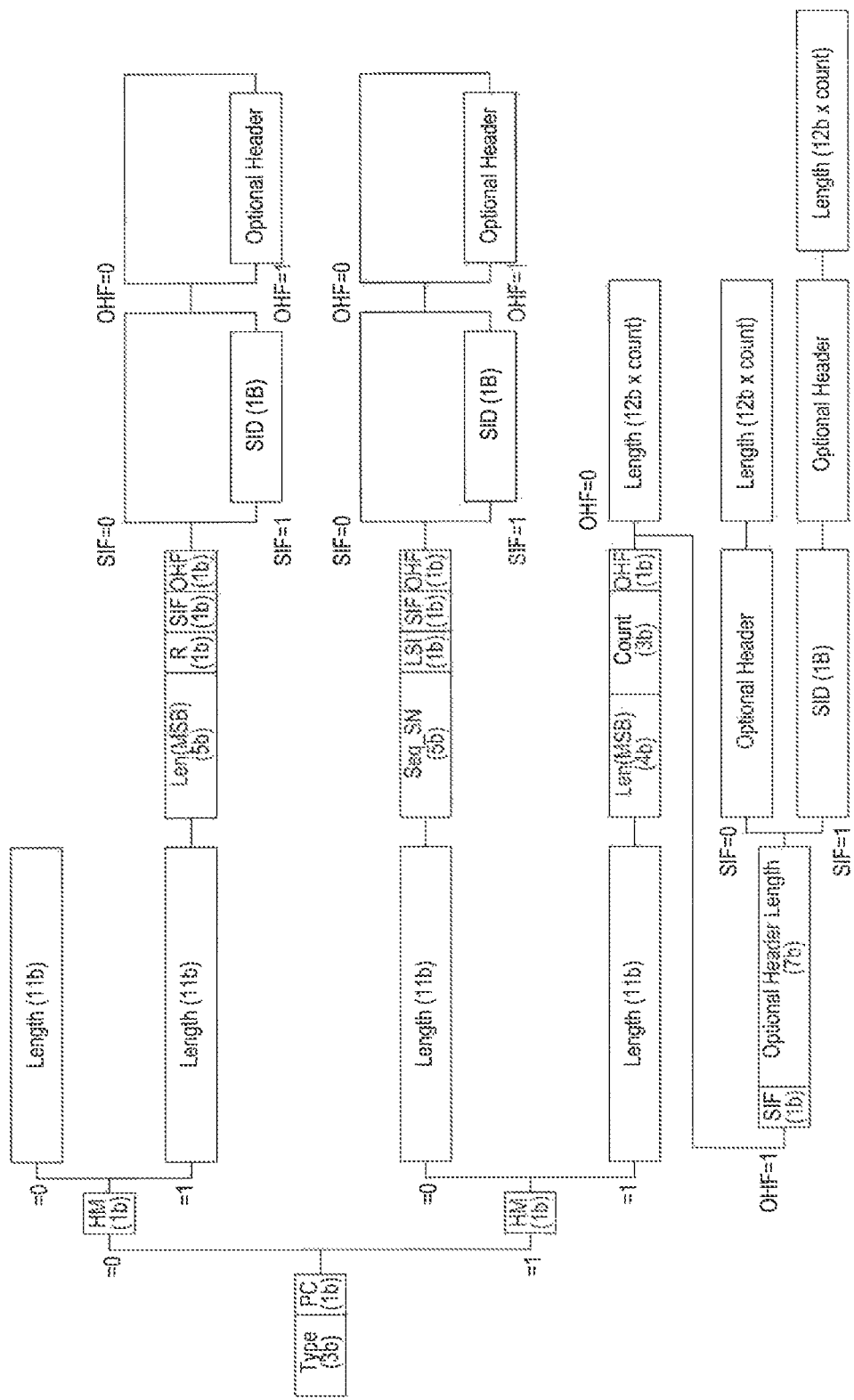
FIG. 5 illustrates an example of a structure of a header of an L2 layer signaling message in the Advanced Television System Committee (ATSC) 3.0.

FIG. 5 illustrates an example of a structure of a header of an L2 layer signaling message in ATSC 3.0.

Referring to FIG. 5, if a value of a packet type field (3b) of an L2 packet header is '100', it means that a payload of the L2 packet includes a signaling message which may include service-related information according to an embodiment of the present disclosure in various forms. According to an embodiment, the service-related information may include service/service component-specific protocol information or changed protocol information. According to an embodiment, the service-related information may be configured and included in at least one of the forms shown in Table 1 through Table 5.

Table 8 shows an example of service-related information included in a signaling message of an L2 packet. Referring to Table 8, according to an embodiment of the present disclosure, the service-related information included in the signaling message of the L2 packet may include an IP address and a port number for identifying each IP session, and a protocol identifier indicating a protocol to be used.

TABLE 8

| | |
|---|---|
| Table ID | To indicate this table is for protocol mapping information |
| Version | To indicate the version of protocol mapping information to be carried in this table |
| Table_length | To indicate the length (in bytes) of this table |
| Number of IP session | To indicate the number of IP sessions |
| For (i=0; i<N; i++) { | |
| IP_session_ID | To identify each IP session (e.g. IP address and Port number etc.) |
| Transport_ID | To indicate the used protocol (e.g. MMT or ROUTE) |
| } | |

Table 9 shows an embodiment where signaling information of the L2 packet includes protocol information or changed protocol information used for transmission of a PLP when L2 signaling is transmitted through one of PLPs for transmitting a service mapped to a logical channel. In this case, when the L2 signaling is transmitted through a separate PLP that is different from a PLP for transmitting media components such as audio, video, etc., information about the number of logical channels and information about a transport ID mapped to an individual logical channel ID may be provided. Herein, the transport ID indicates a protocol used for logical channel transmission. Information of IP sessions used for a service corresponding to a given logical channel, that is, logical channel-to-IP sessions mapping information may be included in Table 9 or may be provided as a separate table. As a result, the reception apparatus may identify IP sessions for a logical channel and a protocol used in each IP session, and operate based on the identified protocol.

TABLE 9

| | |
|---|---|
| Table ID | To indicate this table is for protocol mapping information |
| Version | To indicate the version of protocol mapping information to be carried in this table |
| Table_length | To indicate the length (in bytes) of this table |
| Transport_ID_for_current_logical_CH | To indicator the used protocol for the current logical CH to deliver this L2 signaling |
| Indicator_for_other_logical_CH | To indicate if this table includes the mapping information between other logical channel and Transport |
| If (indicator_for_other_logical_ch == 1) | |
| Number of Logical Channels | To indicate the number of logical channels |
| For (i=0; i<N; i++) { | |
| Logical_CH_ID | To identify each logical CH. (e.g. Service ID, Program ID, TV CH #7, TV CH #9 etc..) |
| Transport_ID | To indicate the used protocol (e.g. MMT or ROUTE) |
| } | |
| } | |

Table 10 shows an embodiment where a signaling message of an L2 packet includes protocol information used for transmission of a PLP for transmitting L2 signaling or changed protocol information. According to another embodiment, protocol information used for PLP-specific transmission, or changed protocol information may be transmitted through L1 signaling of a physical layer. According to an embodiment, information of IP sessions used for a service corresponding to a given logical channel, that is, PLP-to-IP sessions mapping information may be included in Table 10 or may be provided as a separate table.

TABLE 10

| | |
|---|---|
| Table ID | To indicate this table is for protocol mapping information |
| Version | To indicate the version of protocol mapping information to be carried in this table |
| Table length | To indicate the length (in bytes) of this table |
| Transport_ID_for_current_PLP | To indicate the used protocol for the current PLP to deliver this L2 signaling. |
| Indicator_for_other_PLP | To indicate if this table includes the mapping information between other PLP and Transport |
| If (indicator_for_other_PLP == 1) { | |
| Number of other PLPs | To indicate the number of PLP(Physical Layer Pipe)s |
| For (i–0; i<N; i++) { | |
| PLP_ID | To identify each PLP |
| Transport_ID | To indicate the used protocol (e.g. MMT or ROUTE) |
| } | |
| } | |

Table 11 shows an embodiment where a signaling message of an L2 packet includes protocol information used for transmission of a physical RF channel or changed protocol information. Herein, assuming that the RF channel is, for example, a center frequency=1000 MHz, 6 MHz, then protocol information used in the currently connected RF channel may also be indicated through L1 signaling of the physical layer.

TABLE 11

| | |
|---|---|
| Table ID | To indicate this table is for protocol mapping information |
| Version | To indicate the version of protocol mapping information to be carried in this table |
| Table_length | To indicate tire length (in bytes) of this table |
| Transport_ID_for_current_RF | To indicate the used protocol for the current RF to deliver this L2 signaling |
| Indicator_for_other_RF_CH | To indicate if this table includes the mapping information between other RF channel and Transport |
| If (Indicator_for_other_RF_CH == 1) { | |
| Number of other RF Channels | To indicate the number of other RF channels |
| For (i=0; i<N; i++) { | |
| RF_CH_ID | To identify each physical RF CH. (e.g. Center frequency = 1000 MHz, 6 MHz) |
| Transport_ID | To indicate tire used protocol (e.g. MMT or ROUTE) |
| } | |
| } | |

Figure 6:
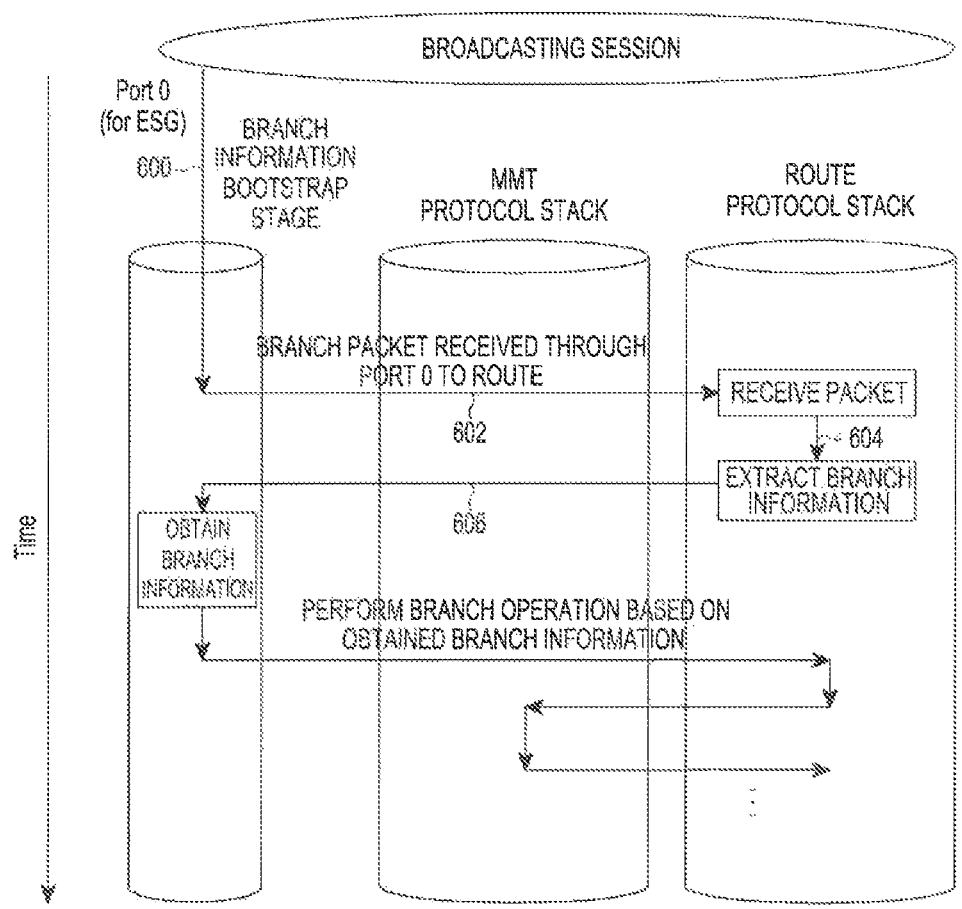
FIG. 6 illustrates operations of a reception apparatus that uses a fixed separate bootstrap port to initially obtain branch information of a service/service component-specific protocol according to an embodiment of the present disclosure.

Meanwhile, in another embodiment of the present disclosure, the transmission apparatus may be configured like high-layer signaling information delivered through an in-band manner, e.g., the ESG, the EPG, the SDP, etc., and may be delivered to the reception side. In this case, the high-layer signaling information delivered in the in-band manner is delivered through an in-band transport protocol defined between the transmission apparatus and the reception apparatus, e.g., the FLUTE, the MMT, the ROUTE, the MMT, the RTP, etc. Thus, the high-layer signaling information delivered in the in-band manner is also configured to include service/service component-specific protocol information. Thus, until receiving the high-layer signaling information, the reception apparatus may not know to which protocol layer a service or service component is to be branched for processing, and thus may not be able to perform a reception operation. In this case, since the reception apparatus has to receive even the high-layer signaling information in the in-band manner, the reception apparatus needs to perform an additional operation of starting receiving a service/service component by initially obtaining information of a service/service component-specific protocol to be received, even in a state of not receiving branch information of the service/service component-specific protocol to be obtained from the high-layer signaling information. To this end, in an embodiment of the present disclosure, the reception apparatus may fix and use a separate bootstrap port for obtaining the branch information of the service/service component-specific protocol. FIG. 6 illustrates operations of a reception apparatus that uses a fixed separate bootstrap port to initially obtain branch information of a service/service component-specific protocol according to an embodiment of the present disclosure. Herein, the branch information may be transmitted assigned with a separate dedicated number.

Referring to FIG. 6, the reception apparatus according to an embodiment of the present disclosure is assumed to select a predetermined port, e.g., a port 0, to preferentially extract branch information transmitted in the in-band manner from the transmission side. A packet to be received through the port 0 is assumed to be received with a pre-agreed protocol, e.g., the 'ROUTE' protocol. Then, the reception apparatus according to an embodiment of the present disclosure receives a packet received from a broadcasting session with the ROUTE protocol in operation 600, and branches the received packet to a ROUTE protocol stack in operation 602. In operation 604, the reception apparatus preferentially extracts the branch information from the received packet.

More specifically, when the asynchronous layered coding (ALC) (RFC 5775) standard like the ROUTE or FLUTE is used, the branch information may be preferentially extracted from the received packet through a pre-agreed transport session identifier (TSI) or transport object identifier (TOI). If the received packet uses the MMT protocol, the branch information may be preferentially extracted through a pre-agreed packet identifier. Then, in operation 606, the ROUTE protocol stack delivers the extracted branch information to a branch information bootstrap session. Packets received through the branch information bootstrap session are branched to a protocol stack through the branch information.

Figure 7:
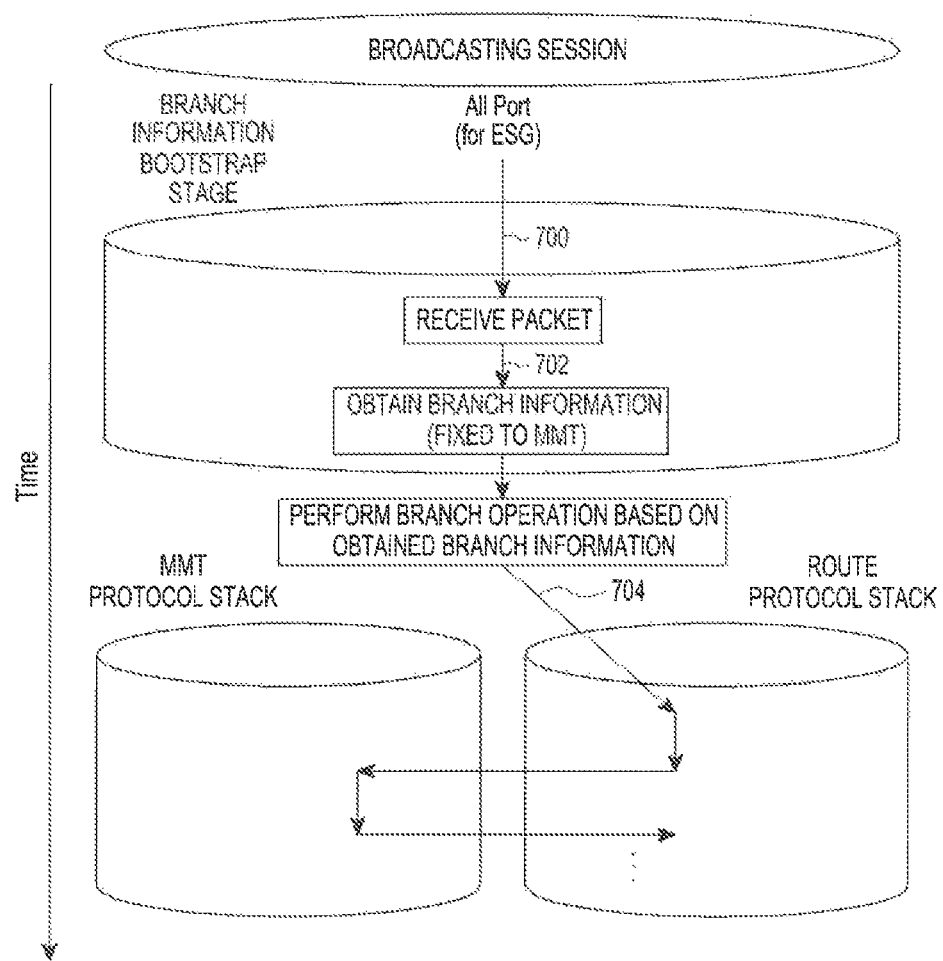
FIG. 7 illustrates operations of a reception apparatus that uses a protocol for initially obtaining branch information as an initial protocol according to an embodiment of the present disclosure.

According to another embodiment including the additional operation of starting receiving a service/service component by initially obtaining information of a service/service component-specific protocol to be received, even in a state of not receiving branch information of the service/service component-specific protocol to be obtained from the high-layer signaling information, the reception apparatus may fix and use an initial protocol for initially obtaining branch information transmitted in the in-band manner. FIG. 7 illustrates operations of a reception apparatus that uses a protocol for initially obtaining branch information as an initial protocol according to an embodiment of the present disclosure.

Referring to FIG. 7, for example, an initial protocol for initially obtaining branch information is set to the MMT protocol. Then, the reception apparatus according to an embodiment of the present disclosure monitors all ports and receives initially received packets using the MMT protocol. In operation 702, the reception apparatus preferentially extracts the branch information from the received packets. More specifically, if using the ALC (RFC 5775) standard such as the ROUTE or FLUTE protocol as the initial protocol, the reception apparatus may preferentially extract the branch information from packets received through a pre-agreed TSI or TOI. If using the MMT protocol as the initial protocol, the reception apparatus preferentially extracts the branch information from a packet received through a pre-agreed packet identifier. In operation 704, the reception apparatus branches each of subsequently received packets to a protocol stack based on the extracted branch information. In another embodiment, service-related information delivered in the in-band manner is delivered to the reception apparatus through L2 signaling. The service-related information may include an IP address or a port number for transmitting high-layer signaling information for receiving a service and include protocol information of a used protocol. According to another embodiment, the transmission apparatus transmits, in the in-band manner, the service-related information to be delivered in the in-band manner, and transmits information about a change of protocol information of the high-layer signaling information to the reception side through L2 signaling or L1 signaling. In this case, the reception apparatus may determine in an L2 layer whether the protocol information of the high-layer signaling information is changed, without checking higher layers.

Meanwhile, the transmission apparatus according to another embodiment of the present disclosure may designate and use a protocol for each port. To be more specific, as shown in Table 12, a range of dynamic ports 49152~65535 proposed in the IRNA may be fixedly assigned to a protocol.

TABLE 12

| Port Number | Used Protocol |
| --- | --- |
| 51000-52000 | MMT over UDP |
| 54000-55000 | ROUTE over UDP |
| 56000-57000 | RTP over UDP |
| . . . | . . . |

For example, the reception apparatus may receive a packet received through ports #51000 to #52000 using the MMT protocol, and preferentially extract branch information of the received packet using a pre-agreed packet identifier. The reception apparatus may receive a packet received through ports #54000 to #55000 using the ROUTE protocol, and preferentially extract branch information of the received packet using a pre-agreed TSI or TOI. According to an embodiment, when designating a protocol for each port, the transmission apparatus may transmit a port number and protocol information mapped to the port number as shown in Table 12 to the reception side through L2 signaling.

FIG. 8 is a block diagram of a reception apparatus according to an embodiment of the present disclosure.

Referring to FIG. 8, the reception apparatus may roughly include an application layer 802, a transport layer 804, a network layer 806, a data link layer 808, and a physical layer 810. The transport layer 804 may include a protocol information analyzer 814 that receives service-related information according to an embodiment of the present disclosure and analyzes protocol information of a service/service component and a protocol control module 812 that branches a packet corresponding to the service/service component to a protocol stack.

The protocol control analyzer 814 extracts protocol information or changed protocol information for transmitting particular media among element media (A/V/File, etc.) corresponding to service components of one service from the received service-related information, and delivers the extracted protocol information or changed protocol information to the protocol control module 812. Herein, the protocol information may be described in the form of, for example, mapping list information A between IP/port information and a protocol for which the element media has to be transmitted. The protocol control module 812 may compare IP/port information (B) included in header information of an UDP/IP packet delivered from a UDP/IP stack with the mapping list information (A) and determine to which protocol stack the UDP/IP packet is to be delivered.

The protocol information analyzer 812 extracts service/service component-specific protocol information or changed protocol information from the service-related information transmitted from the transmission side. The service-related information is delivered through the EPG, the SDP session information, L2 signaling, the header of the IP packet, etc., according to the above-described embodiment. The protocol information analyzer 812 collects/determines the extracted information and delivers the result to the protocol control module 814. According to an embodiment, the protocol information analyzer 814 extracts, from the EPG, mapping list information between IP/port information of element media and a protocol for which the element media has to be transmitted. According to another embodiment, the protocol information analyzer 814 extracts, from an L2 signaling message, mapping list information between a port number of element media and a protocol for which the element media has to be transmitted. According to another embodiment, the protocol information analyzer 814 may extract, from Media Descriptions ("m=") obtained from SDP session information, mapping list information (e.g., m=audio 49170 RTP/AVP 0) between a port number of element media and a protocol for which the element media has to be transmitted. According to another embodiment, the protocol information analyzer 814 may extract, from an indicator designated in an extension header field of an IP packet header, information indicating with which protocol an IP packet has to be delivered and processed.

Figure 9:
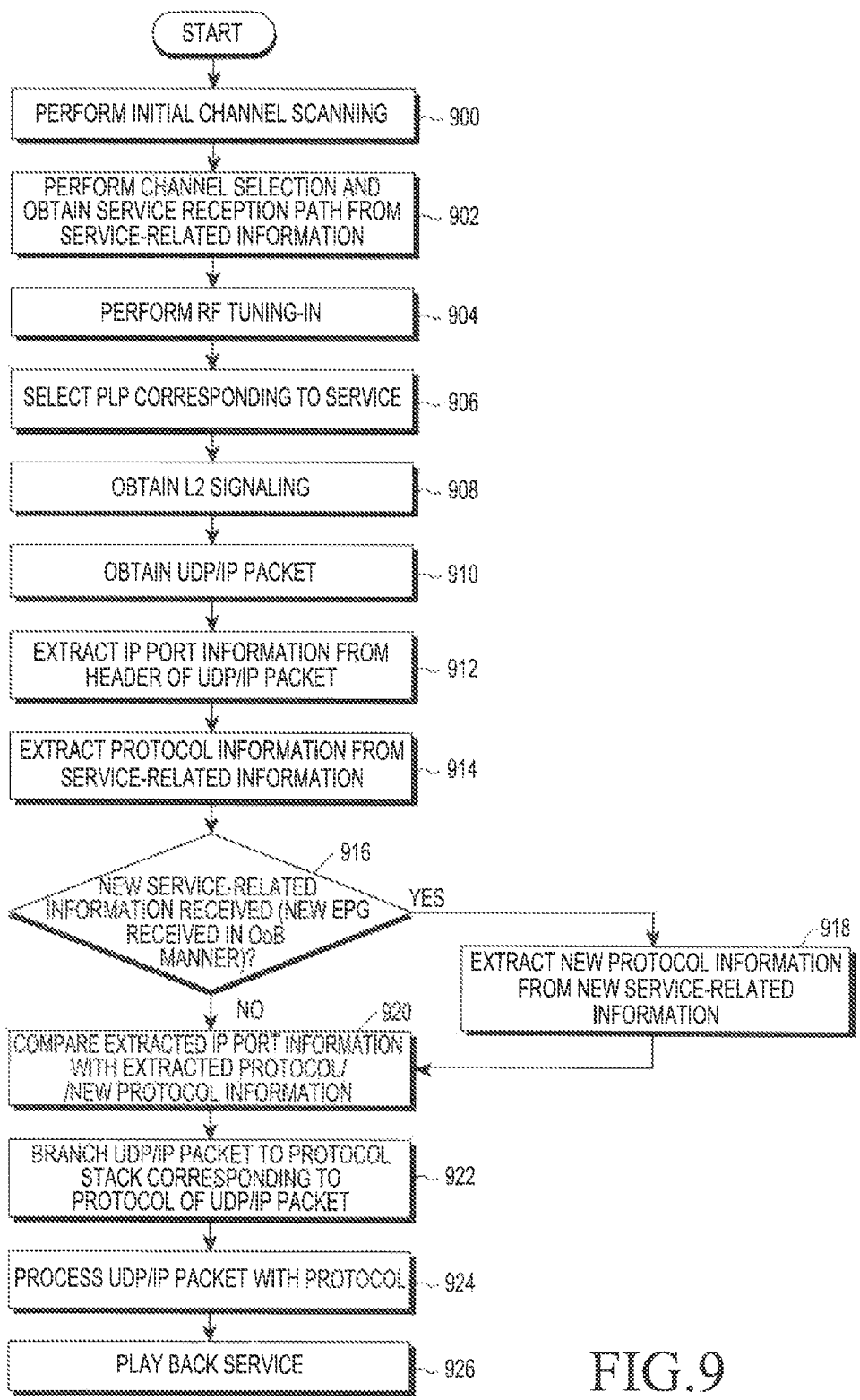
FIG. 9 is a flowchart of operations of a receiver according to an embodiment of the present disclosure.

FIG. 9 is an example of a flowchart of operations of a reception apparatus according to an embodiment of the present disclosure. In the embodiment of FIG. 9, it is described that the reception apparatus obtains service-related information according to an embodiment of the present disclosure through an EPG delivered in the OoB manner. Herein, the service-related information may include service/service component-specific protocol information or changed protocol information.

Referring to FIG. 9, in operation 900, the reception apparatus obtains service-related information through initial channel scanning. The initial scanning in the current embodiment includes an operation in which the reception apparatus obtains the service-related information according to an embodiment of the present disclosure from the EPG delivered in the OoB manner. After the initial channel scanning, in operation 902, the reception apparatus obtains, through channel selection, a route to an IP for receiving a service, e.g., physical channel information such as an RF channel, a PLP identifier, etc., by using the service-related information. The reception apparatus also obtains a protocol used for transmission of the service, e.g., the MMT or the ROUTE (if the EPG information is used).

The reception apparatus performs RF tuning-in based on the service-related information in operation 904, and performs PLP selection corresponding to the service in operation 906. In operation 908, the reception apparatus performs L2 signaling parsing. In L2 signaling parsing, the reception apparatus according to an embodiment of the present disclosure may extract L2 signaling included in a payload by processing a link layer packet and obtain update information of the service-related information and other information through L2 signaling. Herein, the update information of the service-related information may include indication information of a changed protocol if a protocol used for transmission of a service/service component is changed, and the indication information of the changed protocol may be transmitted, for example, through L2 signaling. In this case, bootstrap information for obtaining the indication information of the changed protocol may be included. In L2 signaling parsing, the reception apparatus according to an embodiment of the present disclosure obtains a UDP/IP packet through a UDP/IP session in operation 910. In operation 912, the reception apparatus extracts IP port information from a header of the UDP/IP packet through which media data is transmitted. In operation 914, the reception apparatus extracts service/service component-specific protocol information from the service-related information included in the EPG obtained in the initial scanning. In this case, the service/service component-specific protocol information is assumed to be mapped to an IP port as described with reference to Table 1.

Before comparing the extracted IP port information with protocol information mapped to the UDP/IP packet, the reception apparatus determines whether a new EPG including the changed protocol information is received in operation 916. If the new EPG exists, the reception apparatus extracts new protocol information from the new EPG in operation 918. In operation 920, the reception apparatus compares the extracted IP information with the new protocol information extracted from the new EPG. In operation 922, the reception apparatus branches the UDP/IP packet to a protocol stack corresponding to the extracted IP port information according to the comparison result as shown in Table 1. If determining that the new EPG does not exist in operation 916, the reception apparatus compares the protocol information obtained from the EPG received through the initial channel scanning with the extracted IP port information and branches the UDP/IP packet to a corresponding protocol stack according to the comparison result in operation 922.

The reception apparatus processes a packet with the corresponding protocol in an application layer in operation 924, and plays back the service in operation 926.

Figure 10:
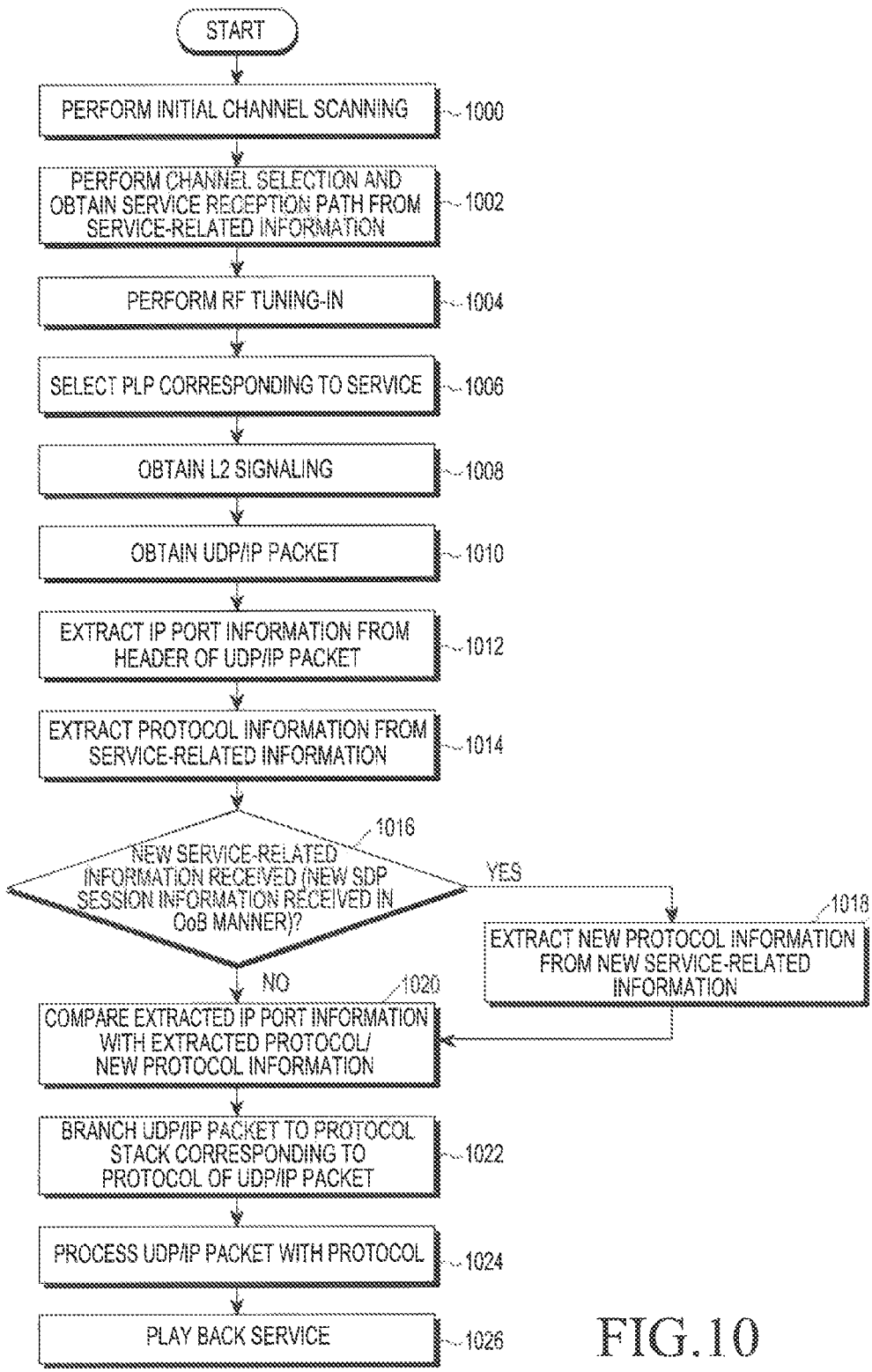
FIG. 10 is a flowchart of operations of a receiver according to an embodiment of the present disclosure.

FIG. 10 is an example of a flowchart of operations of a reception apparatus according to an embodiment of the present disclosure. In the embodiment of FIG. 10, it is assumed that the reception apparatus obtains service-related information according to an embodiment of the present disclosure through SDP session information.

Referring to FIG. 10, in operation 1000, the reception apparatus obtains service-related information through initial channel scanning Herein, the initial scanning may include an operation in which the reception apparatus obtains the service-related information according to an embodiment of the present disclosure from the SDP session information delivered in the OoB manner. After the initial channel scanning, in operation 1002, the reception apparatus obtains, through channel selection, a route to an IP for receiving a service, e.g., physical channel information such as an RF channel, a PLP identifier, etc., by using the service-related information.

The reception apparatus performs RF tuning-in based on the service-related information in operation 1004, and performs PLP selection corresponding to the service in operation 1006. In operation 1008, the reception apparatus performs L2 signaling parsing. In L2 signaling parsing, the reception apparatus according to an embodiment of the present disclosure may extract L2 signaling included in a payload by processing a link layer packet, and obtain update information of the service-related information and other information through L2 signaling. Herein, the update information of the service-related information may include indication information of a changed protocol if a protocol used for transmission of a service/service component is changed, and the indication information of the changed protocol may be transmitted, for example, through L2 signaling. In this case, bootstrap information of an SDP session for obtaining the indication information of the changed protocol may be included. In L2 signaling parsing, the reception apparatus according to an embodiment of the present disclosure obtains a UDP/IP packet through a UDP/IP session in operation 1010. In operation 1012, the reception apparatus obtains the UDP/IP session and extracts IP port information from a header of the UDP/IP packet through which media data is transmitted. In operation 1014, the reception apparatus extracts service/service component-specific protocol information from the service-related information included in the SDP session information obtained in the initial scanning. In this case, the service/service component-specific protocol information is assumed to be mapped to an IP port as described with reference to Table 1.

Before comparing the extracted IP port information with protocol information mapped to the UDP/IP packet, the reception apparatus determines whether new SDP session information including the changed protocol information is received in operation 1016. If the new SDP session information exists, the reception apparatus extracts new protocol information from the new SDP session information in operation 1018. In operation 1020, the reception apparatus compares the extracted IP information with the new protocol information extracted from the new EPG. In operation 1022, the reception apparatus branches the UDP/IP packet to a protocol stack corresponding to the extracted IP port information according to the comparison result as shown in Table 1. If determining that the new SDP session information does not exist in operation 1016, the reception apparatus compares the protocol information obtained from the SDP session information received through the initial channel scanning with the extracted IP port information, and branches the UDP/IP packet to a corresponding protocol stack according to the comparison result in operation 1022.

The reception apparatus processes a packet with the corresponding protocol in an application layer in operation 1024, and plays back the service in operation 1026.

Figure 11:
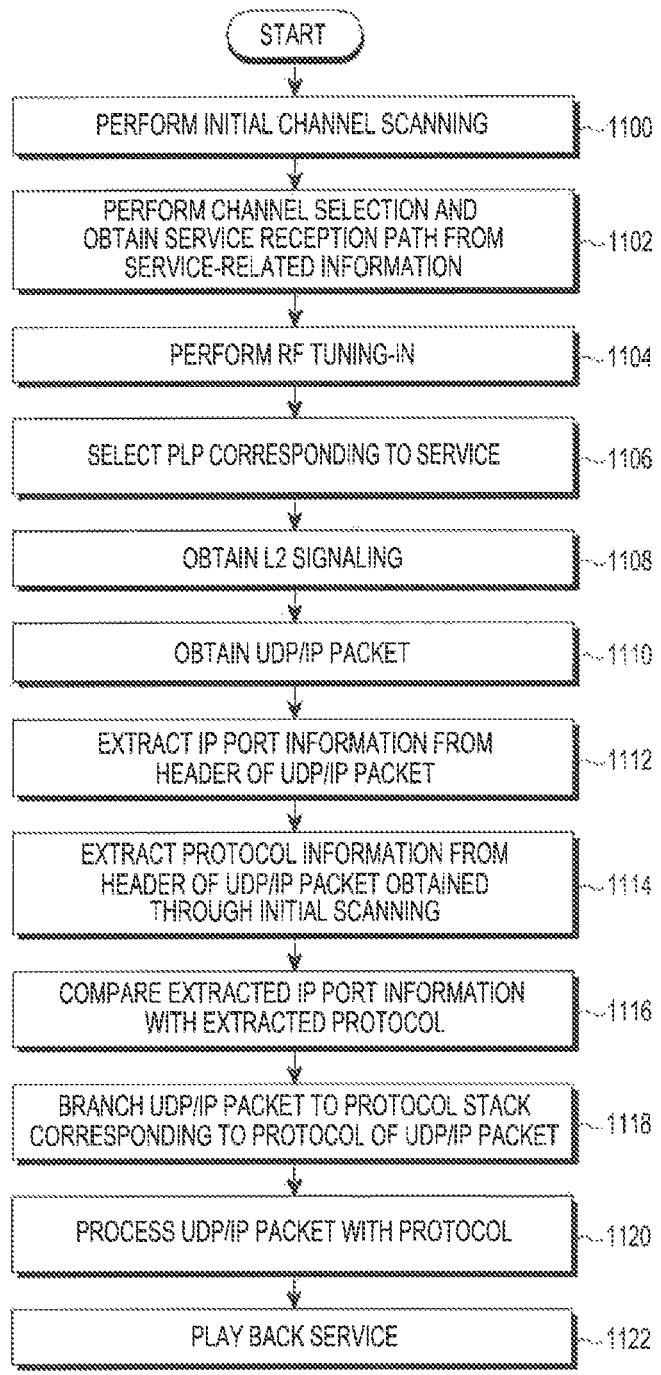
FIG. 11 is a flowchart of operations of a receiver according to an embodiment of the present disclosure.

FIG. 11 is an example of a flowchart of operations of a reception apparatus according to an embodiment of the present disclosure. In the embodiment of FIG. 11, it is assumed that the reception apparatus obtains service-related information according to an embodiment of the present disclosure included in a header of a UDP/IP packet. Herein, the service-related information may include service/service component-specific protocol information or changed protocol information.

Referring to FIG. 11, after performing initial channel scanning in operation 1100, the reception apparatus performs channel selection in operation 1102 to obtain service-related information according to an embodiment of the present disclosure. The reception apparatus obtains a route to an IP for receiving a service, e.g., physical channel information such as an RF channel, a PLP identifier, etc., from the service-related information.

The reception apparatus performs RF tuning-in based on the service-related information in operation 1104, and performs PLP selection corresponding to the service in operation 1106. In operation 1108, the reception apparatus performs L2 signaling parsing. In L2 signaling parsing, the reception apparatus according to an embodiment of the present disclosure may extract L2 signaling included in a payload by parsing a link layer packet, and obtains a UDP/IP packet through which media data is transmitted in operation 1110. The reception apparatus extracts service/service component-specific IP port information through a header of the UDP/IP packet in operation 1112, and extracts service/service component-specific protocol information obtained from the header of the UDP/IP packet obtained in the initial scanning in operation 1114. In this case, the service/service component-specific protocol information is assumed to be mapped to an IP port as described with reference to Table 1.

In operation 1116, the reception apparatus compares the extracted IP information with the protocol information.

In operation 1118, the reception apparatus branches the UDP/IP packet to a protocol stack corresponding to the extracted IP port information according to the comparison result as shown in Table 1. The reception apparatus processes a packet with the corresponding protocol in an application layer in operation 1120, and plays back the service in operation 1122.

Figure 12:
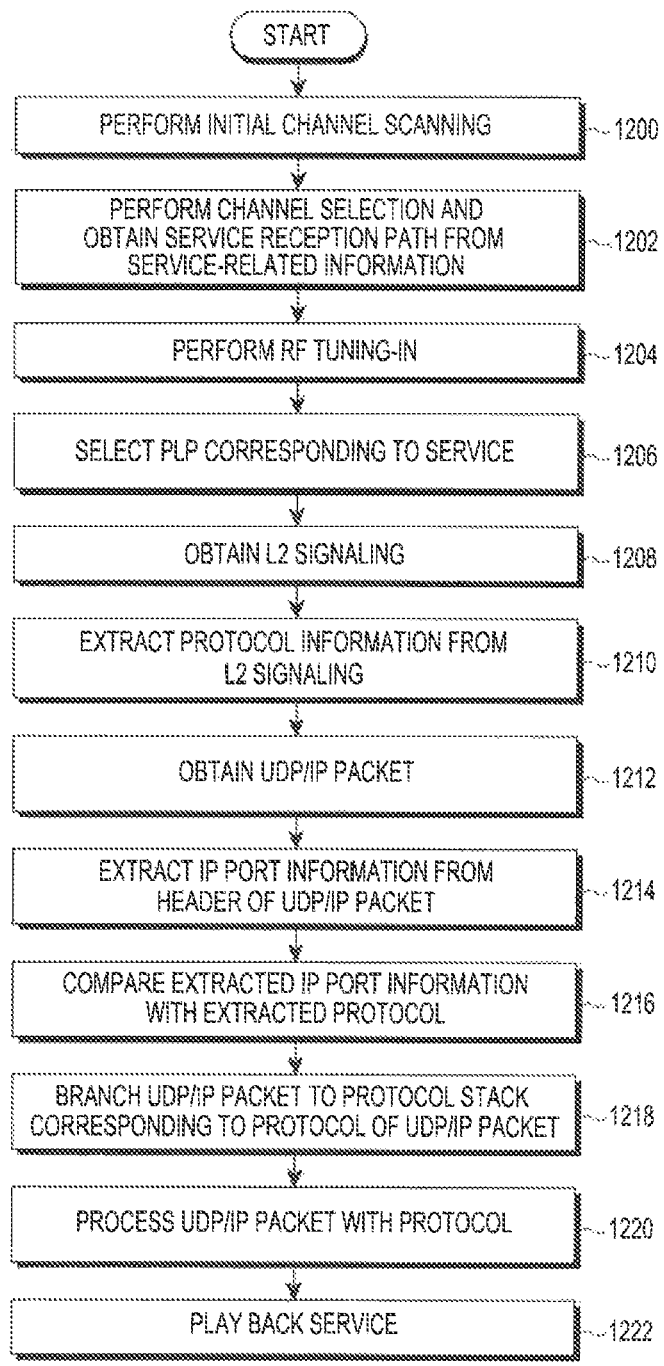
FIG. 12 is a flowchart of operations of a receiver according to an embodiment of the present disclosure.

FIG. 12 is an example of a flowchart of operations of a reception apparatus according to an embodiment of the present disclosure. In the embodiment of FIG. 12, service-related information according to an embodiment of the present disclosure is delivered to the reception side through L2 signaling. Herein, the service-related information may include service/service component-specific protocol information or changed protocol information.

Referring to FIG. 12, in operation 1200, the reception apparatus obtains service-related information through initial channel scanning. In operation 1202, the reception apparatus performs channel selection and obtains a route to an IP for receiving a service, e.g., physical channel information such as an RF channel, a PLP identifier, etc., by using the service-related information.

The reception apparatus performs RF tuning-in based on the service-related information in operation 1204, and performs PLP selection corresponding to the service in operation 1206. In operation 1208, the reception apparatus performs L2 signaling parsing. In L2 signaling parsing, the reception apparatus extracts L2 signaling included in a payload by parsing a link layer packet, and the reception apparatus according to an embodiment of the present disclosure extracts an IP packet through a header of the IP packet and obtains update information and protocol information or changed protocol information of the service-related information through the L2 signaling in operation 1210.

The reception apparatus obtains a UDP/IP packet for transmitting media data in operation 1212, and extracts IP port information from a header of the obtained UDP/IP packet in operation 1214. In operation 1216, the reception apparatus compares the IP information extracted from the header of the UDP/IP packet with the protocol information extracted from the L2 signaling. In operation 1218, the reception apparatus branches the UDP/IP packet to a protocol stack corresponding to the extracted IP port information according to the comparison result as shown in Table 1. The reception apparatus processes a packet with the corresponding protocol in an application layer in operation 1220, and plays back the service in operation 1222.

Figure 13:
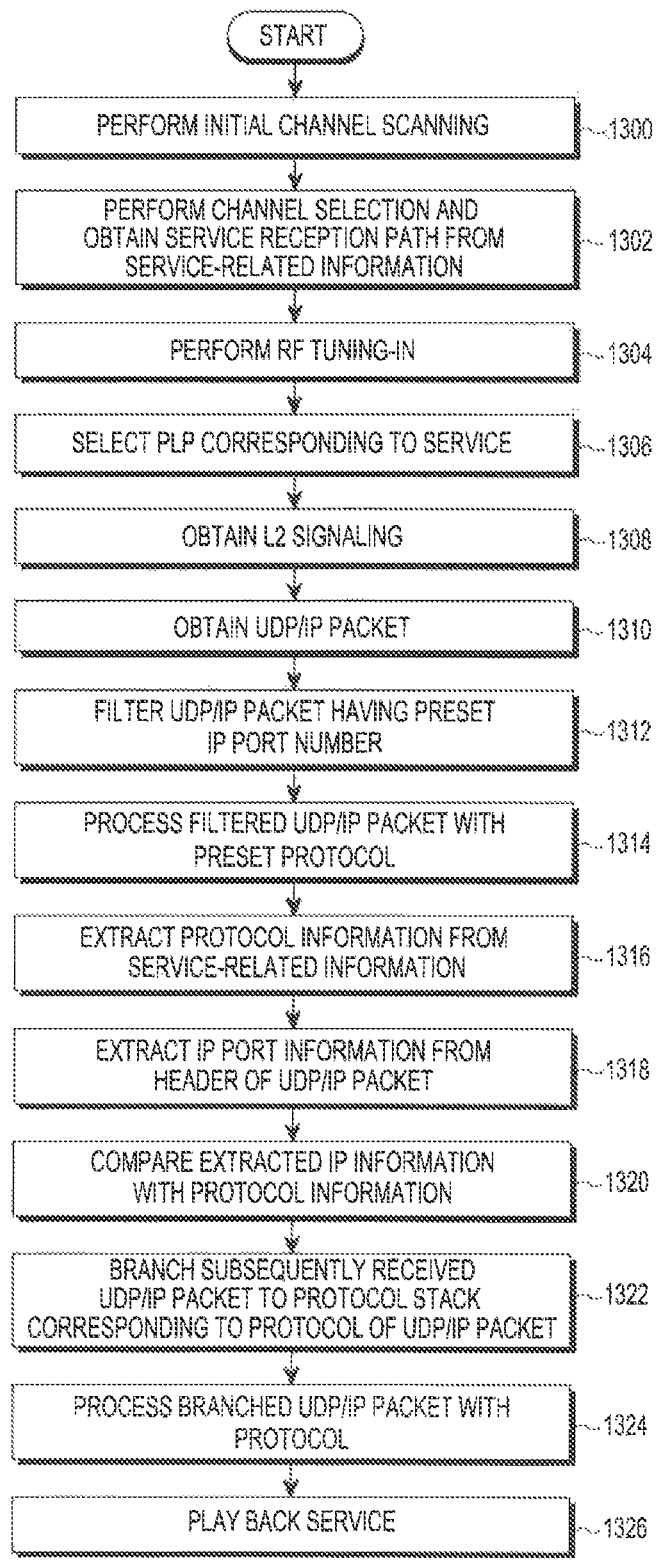
FIG. 13 is a flowchart of operations of a receiver according to an embodiment of the present disclosure.

FIG. 13 is an example of a flowchart of operations of a reception apparatus according to an embodiment of the present disclosure. In the embodiment of FIG. 13, it is described that the reception apparatus obtains service-related information delivered in the in-band manner. Herein, the service-related information delivered in the in-band manner may include, for example, the ESG, the EPG, the SDP session information, etc. The service-related information may include a position of signaling including bootstrap information for receiving the signaling information required for service reception, transport protocol information of the signaling information, and so forth. The position of signaling may be expressed in the form of mapping information between a port number of a port through which the signaling information is transmitted and a protocol indicator. The mapping information may be delivered to the reception side through L2 signaling.

Referring to FIG. 13, in operation 1300, the reception apparatus obtains service-related information delivered in the in-band manner through initial channel scanning After the initial channel scanning, in operation 1302, the reception apparatus obtains, through channel selection, a route to an IP for receiving a service, e.g., physical channel information such as an RF channel, a PLP identifier, etc., by using the service-related information.

The reception apparatus performs RF tuning-in based on the service-related information in operation 1304, and performs PLP selection corresponding to the service in operation 1306. In operation 1308, the reception apparatus performs L2 signaling parsing. In L2 signaling parsing, the reception apparatus according to an embodiment of the present disclosure may extract L2 signaling included in a payload by processing a link layer packet and obtain update information of the service-related information and high-layer protocol information through L2 signaling. The high-layer protocol information is used when the service-related information is obtained through L2 signaling. In operation 1310, the reception apparatus obtains an UDP/IP packet through which media data is transmitted.

As received in the in-band manner, the service-related information according to an embodiment of FIG. 13 is used when an initial UDP/IP packet is received with a preset port number or protocol as described with reference to FIG. 6. Thus, in operation 1312, the reception apparatus filters a UDP/IP packet received at a preset IP port number among the obtained UDP/IP packets. In operation 1314, the reception apparatus branches the filtered UDP/IP packet to a protocol stack corresponding to the preset protocol. In operation 1316, the reception apparatus obtains service/service component-specific protocol information from the service-related information. In operation 1318, the reception apparatus extracts IP port information from a header of the UDP/IP packet. In operation 1320, the reception apparatus compares the extracted IP port information with the service/service component-specific protocol information obtained from the service-related information. In operation 1322, the reception apparatus branches the UDP/IP packet to a protocol stack corresponding to the extracted IP port information according to the comparison result as shown in Table 1. The reception apparatus processes a packet with the corresponding protocol in an application layer in operation 1324, and plays back the service in operation 1326.

Figure 14:
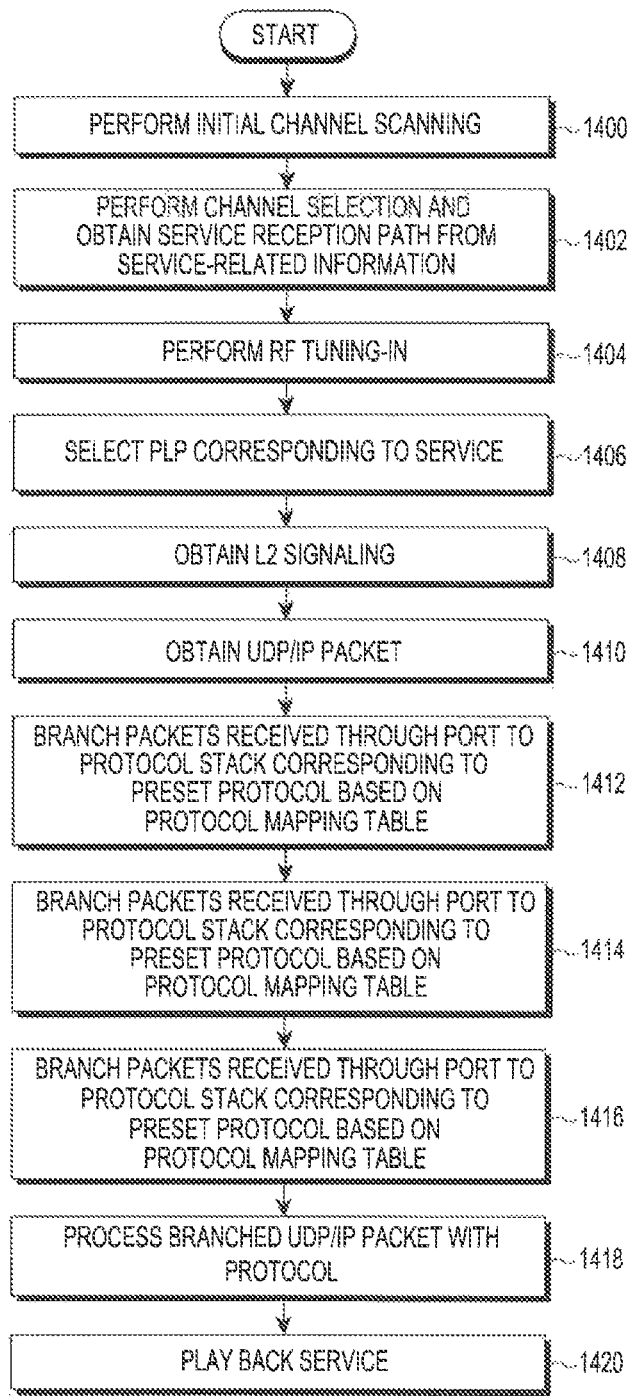
FIG. 14 is a flowchart of operations of a receiver according to an embodiment of the present disclosure.

FIG. 14 is an example of a flowchart of operations of a reception apparatus according to an embodiment of the present disclosure. An embodiment of FIG. 14 fixes an IP port range in which a protocol is used and uses such an IP port. Although not shown, according to an embodiment, information about the IP port range in which the protocol is used may be delivered to the reception side through L2 signaling.

Referring to FIG. 14, in operation 1400, the reception apparatus obtains service-related information according to an embodiment of the present disclosure by performing initial channel scanning Herein, the service-related information may include service/service component-specific protocol information or changed protocol information. In operation 1402, the reception apparatus obtains, through channel selection, a route to an IP for service reception, e.g., physical channel information such as an RF channel, a PLP identifier, etc., by using the service-related information.

The reception apparatus performs RF tuning-in based on the service-related information in operation 1404, and performs PLP selection corresponding to the service in operation 1406. In operation 1408, the reception apparatus performs L2 signaling parsing. In L2 signaling parsing, the reception apparatus according to an embodiment of the present disclosure extracts L2 signaling included in a payload by processing a link layer packet and obtains update information of the service-related information and high-layer protocol information through L2 signaling, in operation 1410. Herein, the update information of the service-related information may include indication information of a changed protocol if a protocol used for transmission of the service is changed, and the indication information of the changed protocol may be transmitted, for example, through L2 signaling. In this case, bootstrap information for obtaining the indication information of the changed protocol may be included. In operation 1410, the reception apparatus obtains an UDP/IP packet through which media data is transmitted. Suppose that the reception apparatus according to the embodiment of FIG. 14 has received protocol information based on the service-related information and has received a protocol mapping table (a port number is mapped to each protocol) including a protocol mapped to each port range as shown in Table 12.

In each of operations 1412 through 1416, the reception apparatus branches UDP/IP packets received through a port to a protocol stack corresponding to a predetermined protocol by using the received protocol information and protocol mapping table. The reception apparatus processes a packet with the corresponding protocol in an application layer in operation 1418, and plays back the service in operation 1420.

FIG. 15 illustrates an example of a protocol stack to which two transport techniques, MMT and ROUTE, according to an embodiment of the present disclosure are applied. Although not shown, an L2 layer exists between an UDP/IP layer and an ATSC 3.0 physical layer.

The transmission side according to an embodiment of the present disclosure configures service-related information including service/service component-specific protocol information or changed protocol information in the form of one of the above-described tables, and delivers the configured service-related information to the reception side. The reception side then receives the service-related information according to at least one or a combination of the embodiments of FIGS. 9 through 14, and identifies a protocol of each UDP/IP packet corresponding to a subsequently received service/service component. The reception side branches the UDP/IP packet to a protocol stack corresponding to the identified protocol and processes and serves the UDP/IP packet in the protocol corresponding to the packet. In FIG. 15, each UDP/IP packet corresponding to a service/service component is received using the MMT or ROUTE protocol, and the received packet is divided into signaling information corresponding to control information and data when the MMT protocol is used. The data may be included in the packet based on an MPU including an independently-decodable minimum unit of a media content transmitted using the MMT protocol. The data may be received in the form of a payload in an MPU mode. If the packet uses ROUTE, it is defined that streaming content formatted by the DASH is delivered through broadcasting. Thus, a packet transmitted from the transmission apparatus using ROUTE is also divided into data and signaling information corresponding to control information, and in this case, the data is received in a DASH segment form defined in a media segment through the packet, and the signaling information is received in a DASH MPD form through the packet. The DASH MPD may indicate, for example, a timeline of DASH segments, etc.

Figure 16A:
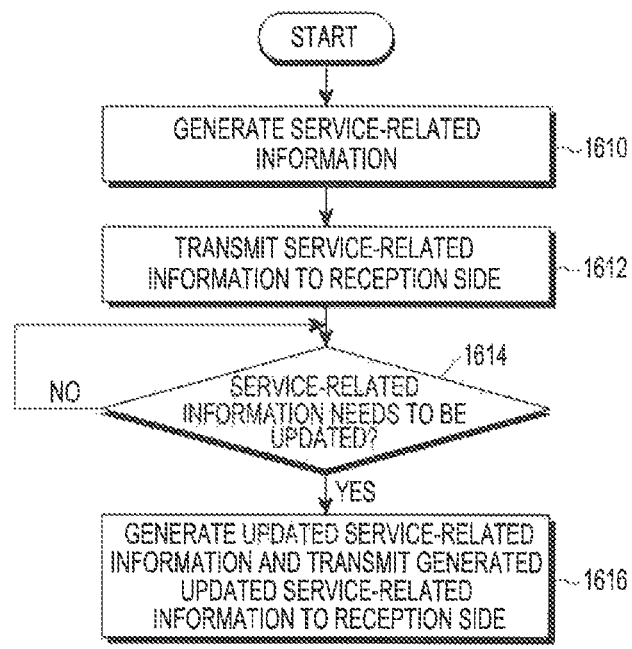
FIG. 16A is a block diagram of a transmission apparatus according to an embodiment of the present disclosure.

FIG. 16A is a block diagram of a transmission apparatus according to an embodiment of the present disclosure.

Referring to FIG. 16A, a transmission apparatus 1600 may include a controller 1602, a transceiver 1604, and a service-related information generator 1606.

Figure 16B:
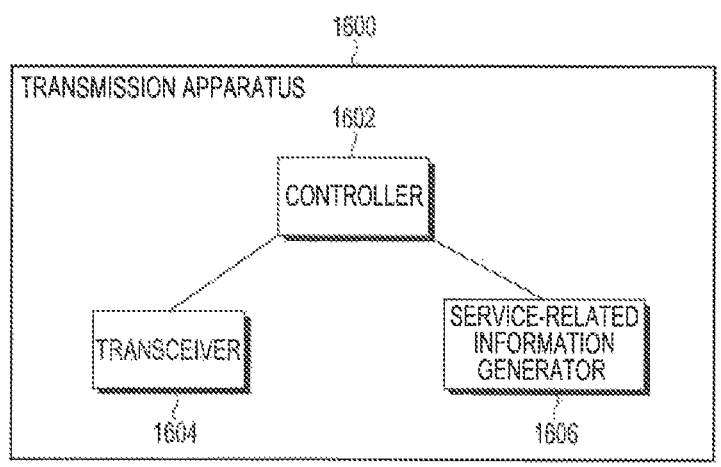
FIG. 16B is a flowchart of operations of a transmission apparatus according to an embodiment of the present disclosure.

FIG. 16B is a flowchart of operations of a transmission apparatus according to an embodiment of the present disclosure.

Referring to FIG. 16B, the service-related information generator 1606 according to an embodiment of the present disclosure configures service-related information under control of the controller 1602 in operation 1600. Herein, the service-related information may include service/service component-specific protocol information or changed protocol information provided by a broadcasting system and may be configured as shown in Table 1 through Table 5. The service-related information may further include position information of signaling information for the reception side's service reception and protocol information. The position information of the signaling information may include bootstrap information in order for the reception side to receive the signaling information, and the protocol information may include a protocol indicator used for transmission. According to an embodiment, the protocol information may be transmitted in which an IP address, a port number, etc., to which the signaling information is transmitted, are mapped to a protocol indicator.

In operation 1602, under control of the controller 1064, the transceiver 1064 delivers the service-related information to the reception side before providing a broadcasting service to the reception side. The service-related information may be periodically transmitted at intervals preset by an operator or a user before a broadcasting service is provided.

In operation 1604, the controller 1602 determines whether the service-related information needs to be updated according to a change of a channel environment, a user's request, etc. If determining that the update is not needed, the transmission apparatus waits for next update.

If determining that the update of the service-related information is needed, in operation 1606, the controller 1602 updates the service-related information and controls the service-related information generator 1606 to generate the updated service-related information. Herein, the updated service-related information may include the above-described changed protocol information, and so forth. In operation 1606, the transceiver 1604 transmits the updated service-related information to the reception side under control of the controller 1602. The updated service-related information may be transmitted in a form that is different from the service-related information transmitted in operation 1600. For example, if previous service-related information is transmitted in the form of an ESG, an EPG, or SPD session information in the in-band manner, the updated service-related information may be separately transmitted to the reception side through L2 signaling. If the previous service-related information is delivered to the reception side in the OoB manner, the updated service-related information may be transmitted to the reception side in the OoB manner at a different point in time.

As described above, an embodiment of the present disclosure provides a protocol suitable for each environment based on real-time/non-real-time services and characteristics of various devices, transmits a service from a transmission side by using a protocol based on advantages and characteristics of different protocols, and delivers service information including protocol information about a service or service component to a reception side, thereby allowing the reception side to efficiently receive the service corresponding to the service/service component based on the protocol information.

While embodiments of the present disclosure have been described, various changes may be made without departing the scope of the present disclosure. While the disclosure has been shown and described with reference to certain exemplary embodiments thereof, it will be understood by those skilled in the art that various changes in form and details may be made therein without departing from the spirit and scope of the disclosure as defined by the appended claims and their equivalents.

What is claimed is:

1. An apparatus for transmitting media content in a broadcasting communication system, the apparatus comprising:
   a transmitter; and
   a controller configured to:
      identify a protocol for transmitting signaling information,
      generate service-related information providing bootstrap information for discovery of the signaling information, the service-related information including protocol information indicating a type of the identified protocol,
      transmit the service-related information, and
      transmit the signaling information,
   wherein, in case that the protocol information is set to a first value, the protocol information indicates that the type of the identified protocol is real-time object delivery over unidirectional transport (ROUTE) protocol, and wherein, in case that the protocol information is set to a second value, the protocol information indicates that the type of the identified protocol is moving picture experts group media transport protocol (MMTP).

2. The apparatus of claim 1, wherein the bootstrap information is determined based on the identified protocol.

3. The apparatus of claim 1, wherein the controller is further configured to transmit the media content as a plurality of units defined according to the identified protocol by using the identified protocol.

4. An apparatus for receiving media content in a broadcasting communication system, the apparatus comprising:
  a receiver; and
  a controller configured to:
    receive service-related information providing bootstrap information for discovery of signaling information, the service-related information including protocol information indicating a type of a protocol used for transmitting the signaling information, and
    receive the signaling information based on the service-related information, and
  wherein, in case that the protocol information is set to a first value, the protocol information indicates that the type of the protocol is real-time object delivery over unidirectional transport (ROUTE) protocol, and
  wherein, in case that the protocol information is set to a second value, the protocol information indicates that the type of the protocol is moving picture experts group media transport protocol (MMTP).

5. The apparatus of claim 4, wherein the bootstrap information is determined based on the type of protocol used for transmitting the signaling information.

6. The apparatus of claim 4, wherein the controller is further configured to receive the media content as a plurality of units defined according to the type of protocol used for transmitting the signaling information by using the type of protocol used for transmitting the signaling information.

* * * * *